US008912730B2

United States Patent
Nakajo et al.

(10) Patent No.: US 8,912,730 B2
(45) Date of Patent: Dec. 16, 2014

(54) WIRELESS POWER SUPPLY SYSTEM FOR LIGHTING AND LIGHTING APPARATUS

(71) Applicant: Panasonic Corporation, Osaka (JP)

(72) Inventors: Akira Nakajo, Kyoto (JP); Nadda Chawalarat, Osaka (JP); Hiroshi Kido, Osaka (JP)

(73) Assignee: Panasonic Corporation, Osaka (JP)

( * ) Notice: Subject to any disclaimer, the term of this patent is extended or adjusted under 35 U.S.C. 154(b) by 69 days.

(21) Appl. No.: 13/731,228

(22) Filed: Dec. 31, 2012

(65) Prior Publication Data

US 2013/0175937 A1 Jul. 11, 2013

(30) Foreign Application Priority Data

Jan. 10, 2012 (JP) ................................. 2012-002519
Aug. 3, 2012 (JP) ................................. 2012-173098

(51) Int. Cl.

| H05B 37/02 | (2006.01) |
| H05B 39/04 | (2006.01) |
| H05B 41/36 | (2006.01) |
| H02J 5/00 | (2006.01) |
| H02J 17/00 | (2006.01) |

(52) U.S. Cl.
CPC ............... *H05B 37/02* (2013.01); *H02J 5/005* (2013.01); *H02J 17/00* (2013.01)
USPC ........... 315/218; 315/149; 315/152; 315/192; 315/221; 315/276

(58) Field of Classification Search
None
See application file for complete search history.

(56) References Cited

U.S. PATENT DOCUMENTS

| 6,301,128 B1 * | 10/2001 | Jang et al. ........................ 363/17 |
| 8,294,388 B2 * | 10/2012 | Wong et al. .................... 315/307 |
| 2002/0008973 A1 * | 1/2002 | Boys et al. ..................... 362/307 |

FOREIGN PATENT DOCUMENTS

| JP | 2853207 B2 | 3/1999 |
| JP | 2004-187418 A | 7/2004 |
| JP | 2006-325350 A | 11/2006 |
| JP | 2007-053861 A | 3/2007 |
| JP | 2011-029067 A | 2/2011 |
| JP | 2011-050163 A | 3/2011 |
| JP | 2011-151913 A | 8/2011 |
| WO | WO 2011143059 A1 * | 11/2011 |

* cited by examiner

*Primary Examiner* — Anh Tran

(74) *Attorney, Agent, or Firm* — Renner, Otto, Boisselle & Sklar, LLP

(57) ABSTRACT

A wireless power supply system for lighting includes: a power transmission unit including a power transmission coil; and a power reception unit including a power reception coil. The power transmission coil generates an AC magnetic field in response to a supplied AC power. The power reception coil receives an electric power from the power transmission unit through an electromagnetic induction due to the AC magnetic field generated by the power transmission coil. The power reception unit further includes a power circuit and a receive-side control section. The power circuit receives an output power from the power reception coil and to perform Buck-Boost operation so as to output a predetermined electric power to a lighting load. The receive-side control section controls the Buck-Boost operation of the power circuit. The power circuit is configured to be capable of boosting and stepping-down of the output power from said power reception coil.

21 Claims, 12 Drawing Sheets

WIRELESS POWER SUPPLY SYSTEM FOR LIGHTING AND LIGHTING APPARATUS

TECHNICAL FIELD

This invention relates to a wireless power supply system for lighting and a lighting apparatus.

BACKGROUND ART

For example, Japanese patent No. 2853207 (hereinafter referred to as document 1), Japanese patent application publication No. 2011-50163A (hereinafter referred to as document 2), and Japanese patent application publication No. 2011-29067A (hereinafter referred to as document 3) disclose wireless power supply systems (contactless power supply systems) configured to supply a lighting load with electric power in a non-contact manner. Such a wireless power supply system includes a power transmission unit and a power reception unit. The power transmission unit includes a power transmission coil to which an AC power is supplied. The power reception unit includes a power reception coil which receives an electric power from the power transmission unit through an electromagnetic induction due to an AC magnetic field generated by the power transmission coil in a contactless manner.

Document 1 discloses a power supply system including a power supply transformer and a communication transformer. The power transmission coil and the power reception coil are composed by the power supply transformer. The power transmission unit supplies the power reception unit with an electric power through the power supply transformer in a non-contact manner. The power reception unit transmits a feed-back signal to the power transmission unit through the communication transformer in a contactless manner. Herein, the feed-back signal includes information with respect to a current flowing through a lighting load, a voltage of the lighting load, and the like. The power transmission unit adjusts the supply power to the power reception unit according to the feed-back signal received from the power reception unit.

Document 2 discloses a wireless power supply system for supplying an LED element with an electric power in a contactless manner. Document 3 discloses a lighting apparatus to which an electric power is supplied in a contactless manner.

In the conventional wireless power supply system, it is possible that supply power to the lighting load becomes unstable, because an output voltage of the power reception coil varies due to: a load change caused by a temperature character, an age-related deterioration or the like; a relative position gap (misalignment) between the power transmission unit (power transmission coil) and the power reception unit (power reception coil); and the like.

The power supply system disclosed in Document 1 performs a feed-back control between the power transmission unit and the power reception unit by use of the communication transformer. However, in this system, it is possible that the feed-back signal cannot be transmitted correctly due to: a variation in windings of the communication transfer, a positional misalignment between a primary side and a secondary side of the communication transformer, or the like. In these cases, output voltage of the power reception coil may fluctuate, and it is possible that supply power to the lighting load becomes unstable.

DISCLOSURE OF INVENTION

The present invention is developed in view of above problem, and an object of the present invention is to provide a wireless power supply system for lighting and a lighting apparatus which can supply a stable electric power to a lighting load regardless of the fluctuation of the output power of the power reception coil.

A wireless power supply system for lighting of the invention comprising: a power transmission unit comprising a power transmission coil, said power transmission coil being configured to generate an AC magnetic field in response to a supplied AC power; and a power reception unit comprising a power reception coil, said power reception coil being configured to receive an electric power from said power transmission unit through an electromagnetic induction due to the AC magnetic field generated by said power transmission coil, wherein said power reception unit comprises a power circuit and a receive-side control section, said power circuit being configured to receive an output power from said power reception coil and to perform Buck-Boost operation so as to output a predetermined electric power to a lighting load, said receive-side control section being configured to control the Buck-Boost operation of said power circuit, wherein said power circuit is configured to be capable of boosting and stepping-down of the output power from said power reception coil.

In the wireless power supply system for lighting of this invention, it is preferred that said power circuit is composed of a Buck-Boost converter circuit, a SEPIC circuit, a CUK circuit, or a ZETA circuit.

In the wireless power supply system for lighting of this invention, it is preferred that wherein said receive-side control section is configured to measure an output current from said power circuit, and to control said power circuit so as to supply said lighting load with a constant current based on the measured output current value.

In the wireless power supply system for lighting of this invention, it is preferred that wherein said power circuit comprises a switching device being capable of turning on and off by a chopper control, and wherein said receive-side control section is configured to measure a peak value of an electric current flowing through said switching device, and to control said power circuit so as to supply said lighting load with a constant current based on the measured peak value.

In the wireless power supply system for lighting of this invention, it is preferred that wherein said power circuit comprises a switching device being capable of turning on and off by a chopper control, and wherein said receive-side control section is configured to measure an average value of an electric current flowing through said switching device, and to control said power circuit so as to supply said lighting load with a constant current based on the measured average value.

In the wireless power supply system for lighting of this invention, it is preferred that wherein said power reception unit comprises a rectification section configured to rectify an output voltage of said power reception coil and to output a rectified voltage to said power circuit, wherein said power circuit comprises a switching device being capable of turning on and off by a chopper control, and wherein said receive-side control section is configured to control said power circuit so that switching frequency of said switching device is equal to or more than a frequency of the AC power supplied to said power transmission coil.

In the wireless power supply system for lighting of this invention, it is preferred that wherein said power reception unit comprises: a rectification section configured to rectify an output voltage of said power reception coil and to output a rectified voltage to said power circuit; a ripple measurement section configured to measure a ripple component in an input or output of said power circuit; and a signal transmitting section configured to transmit the measurement result of the ripple component to said power transmission unit, wherein said power transmission unit comprises: a signal receiving section configured to receive the measurement result transmitted from said signal sending section; and an AC source section configured to supply the AC voltage to said power transmission coil, and wherein said power transmission unit is configured, when said ripple component is larger than a predetermined threshold, to increase at least one of an amplitude and a frequency of the AC voltage which is supplied to said power transmission coil from said AC source section.

In the wireless power supply system for lighting of this invention, it is preferred that wherein said power transmission unit comprises a hollow housing, one side of said housing being defined as a placement side, a plurality of said power transmission coils being arranged so as to face a back surface of said placement side, and wherein said power reception unit is placed on a front surface of said placement side.

In the wireless power supply system for lighting of this invention, it is preferred that wherein said power transmission unit comprises a hollow housing, one side of said housing being defined as a placement side, wherein said power transmission unit is provided with one or more of said power transmission coils so as to face a back surface of said placement side, said power transmission coils being configured to be movable, wherein said power transmission unit is configured to move said power transmission coils so as to face said power reception unit when said power reception unit is placed on a front surface of said placement side.

In the wireless power supply system for lighting of this invention, it is preferred that wherein said wireless power supply system is adapted so that one of said power transmission unit supplies a plurality of said power reception units with electric power.

In the wireless power supply system for lighting of this invention, it is preferred that wherein said plurality of said power reception units include a first power reception unit and a second power reception unit, said second power reception unit being configured to have a different input power or output power in specification from said first receiving unit.

In the wireless power supply system for lighting of this invention, it is preferred that wherein said lighting load includes an LED device or an organic EL device.

A lighting apparatus of the invention is the lighting apparatus adapted to be placed on a power transmission unit comprising a power transmission coil, said power transmission coil being configured to generate an AC magnetic field in response to a supplied AC power, wherein said lighting apparatus comprises: a power reception unit comprising a power reception coil, a power circuit, and a receive-side control section, said power reception coil being configured to receive an electric power from said power transmission unit through an electromagnetic induction due to the AC magnetic field generated by said power transmission coil, said power circuit being configured to receive an output power from said power reception coil and to perform Buck-Boost operation so as to output a predetermined electric power, said receive-side control section being configured control the Buck-Boost operation of said power circuit, said power circuit being configured to be capable of boosting and stepping-down of the output power from said power reception coil; and a lighting load configured to be supplied an electric power from said power circuit.

In other words, the lighting apparatus of the invention is the lighting apparatus adapted to be used in the preceding wireless power supply system for lighting of this invention, wherein said lighting apparatus comprises: a power reception unit comprising a power reception coil, a power circuit, and a receive-side control section, said power reception coil being configured to receive an electric power from said power transmission unit through an electromagnetic induction due to the AC magnetic field generated by said power transmission coil, said power circuit being configured to receive an output power from said power reception coil and to perform Buck-Boost operation so as to output a predetermined electric power, said receive-side control section being configured control the Buck-Boost operation of said power circuit, said power circuit being configured to be capable of boosting and stepping-down of the output power from said power reception coil; and a lighting load configured to be supplied an electric power from said power circuit.

In the lighting apparatus of this invention, it is preferred that wherein said power reception unit comprises: a base in which said power reception coil is included; an arm, one end of said arm being connected to said base; and a lamp fitting in which said lighting load is included, said lamp fitting being connected to the other end of said arm.

According to the present invention, it is enabled to stabilize the supply power to a lighting load regardless of the fluctuation of the output power of the power reception coil due to load change or positional misalignment between the power transmission coil and the power reception coil.

DESCRIPTION OF EMBODIMENTS

Hereinafter, embodiments of the present invention are explained with reference to drawings.

First Embodiment

Figure 1:
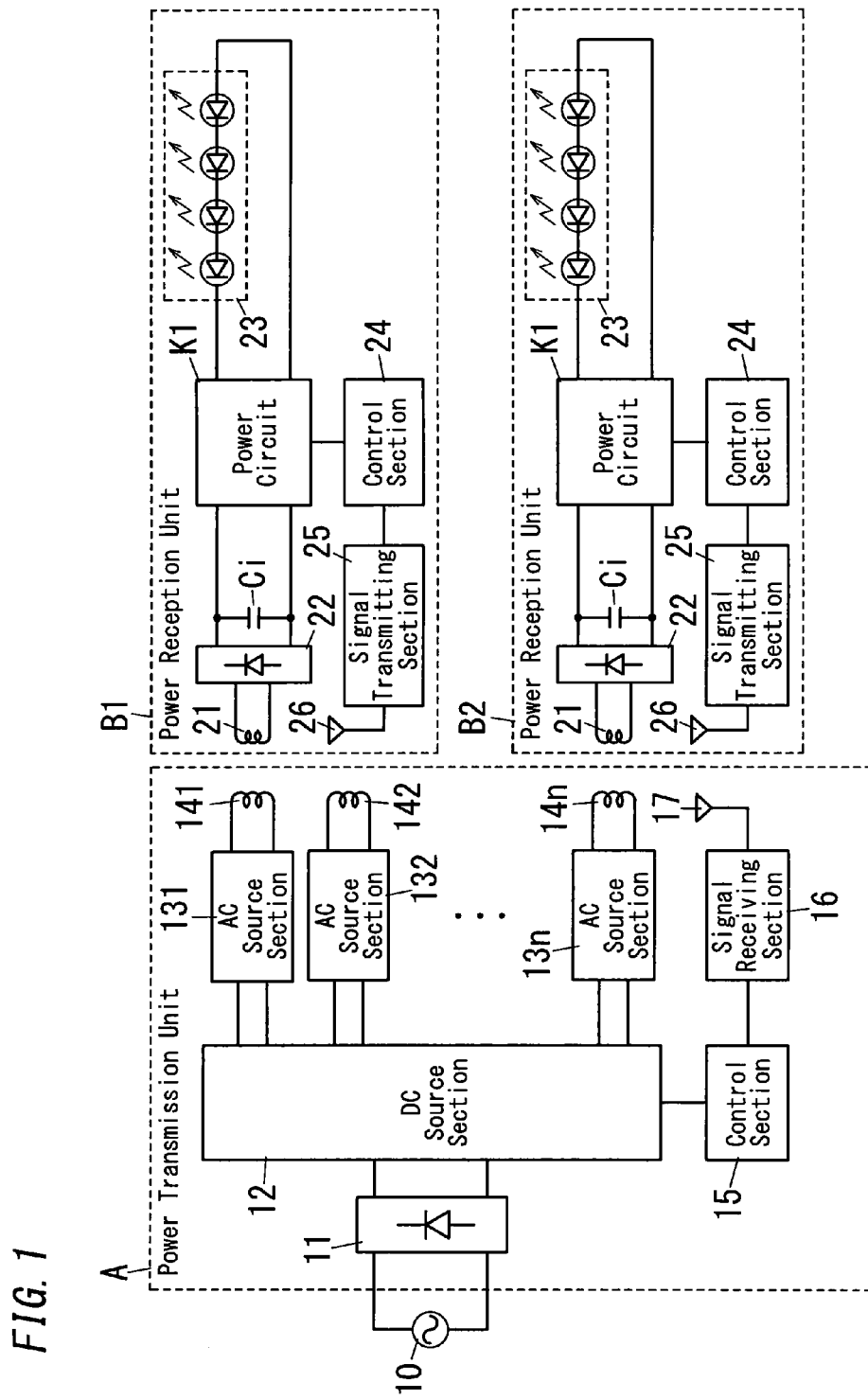
FIG. 1 is a schematic circuit diagram showing a system configuration according to first embodiment.

A circuit configuration according to a wireless power supply system (contactless power supply system) for lighting of this embodiment is shown in FIG. 1.

The present system includes one power transmission unit A and one or more of power reception units B (B1, B2 ... Bn). The system exemplified in FIG. 1 includes one power transmission unit A and two power reception units (B1, B2). Hereinafter, when not particularly specified, the power reception unit is denoted by a sign "B". Here, the power reception unit B is provided separately from the power transmission unit A.

The power transmission unit A includes a rectification section 11, a DC source section 12, AC source sections (131~13n), power transmission coils (141~14n), a control section (transmission-side control section) 15, a signal receiving section 16, and an antenna 17. Hereinafter, when not particularly specified, the AC source section is denoted by a sign "13". Hereinafter, when not particularly specified, the power transmission coil is denoted by a sign "14".

An AC power is input to the rectification section 11 from a commercial power source 10. The rectification section 11 full-wave rectifies the input AC power, and output the electric power. The DC source section 12 converts the rectified power outputted from the rectification section 11 into a predetermined DC power, and output the DC power to the AC source sections (131~13n). The power transmission coils (141~14n) are provided to the AC source sections (131~13n), respectively. The DC power is input to each of the AC source section 13 from the DC source section 12. Each of the AC source section 13 converts the input DC power into an AC power with a predetermined frequency to output to the corresponding power transmission coil 14. Each of the power transmission coils (141~14n) generates an AC magnetic field in response to a supplied AC power from a corresponding AC source section (131~13n).

The control section 15 controls the operations of the DC source section 12 and the AC source sections (131~13n). The signal receiving section 16 receives a wireless signal (such as a radio signal or an infrared signal) transmitted from the power reception unit B through the antenna 17, and sends the signal to the control section 15.

The power reception unit B includes a power reception coil 21, a rectification section 22, an input capacitor Ci, a power circuit K1, a control section (receive-side control section) 24, signal transmitting section 25, and an antenna 26. An LED unit 23 is attached (connected) to the power reception unit B.

The power reception coil 21 receives an electric power from the power transmission unit A in a wireless (contactless) manner through an electromagnetic induction due to the AC magnetic field generated by the power transmission coils (141~14n). In detail, the power reception coil 21 receives an electric power from the power transmission unit A in a wireless (contactless) manner through an electromagnetic induction due to the AC magnetic field generated by at least one of the power transmission coils (141~14n). The rectification section 22 rectifies an AC voltage (induced voltage) generated across the power reception coil 21. The input capacitor Ci is adapted to smooth the rectified voltage of the rectification section 22. The power circuit K1 is inputted the electric power outputted from the input capacitor Ci, and to perform a boost/step-down operation to output a desired DC voltage to the LED UNIT 23. The LED unit 23 is a lighting load includes one or more LED devices. The LED unit 23 is supplied with a load current from the power circuit K1 and is illuminated. That is, the power circuit K1 is configured to receive an output power of the power reception coil 21 and performs a Buck-Boost operation, thereby illuminates the LED unit 23.

Figure 2:
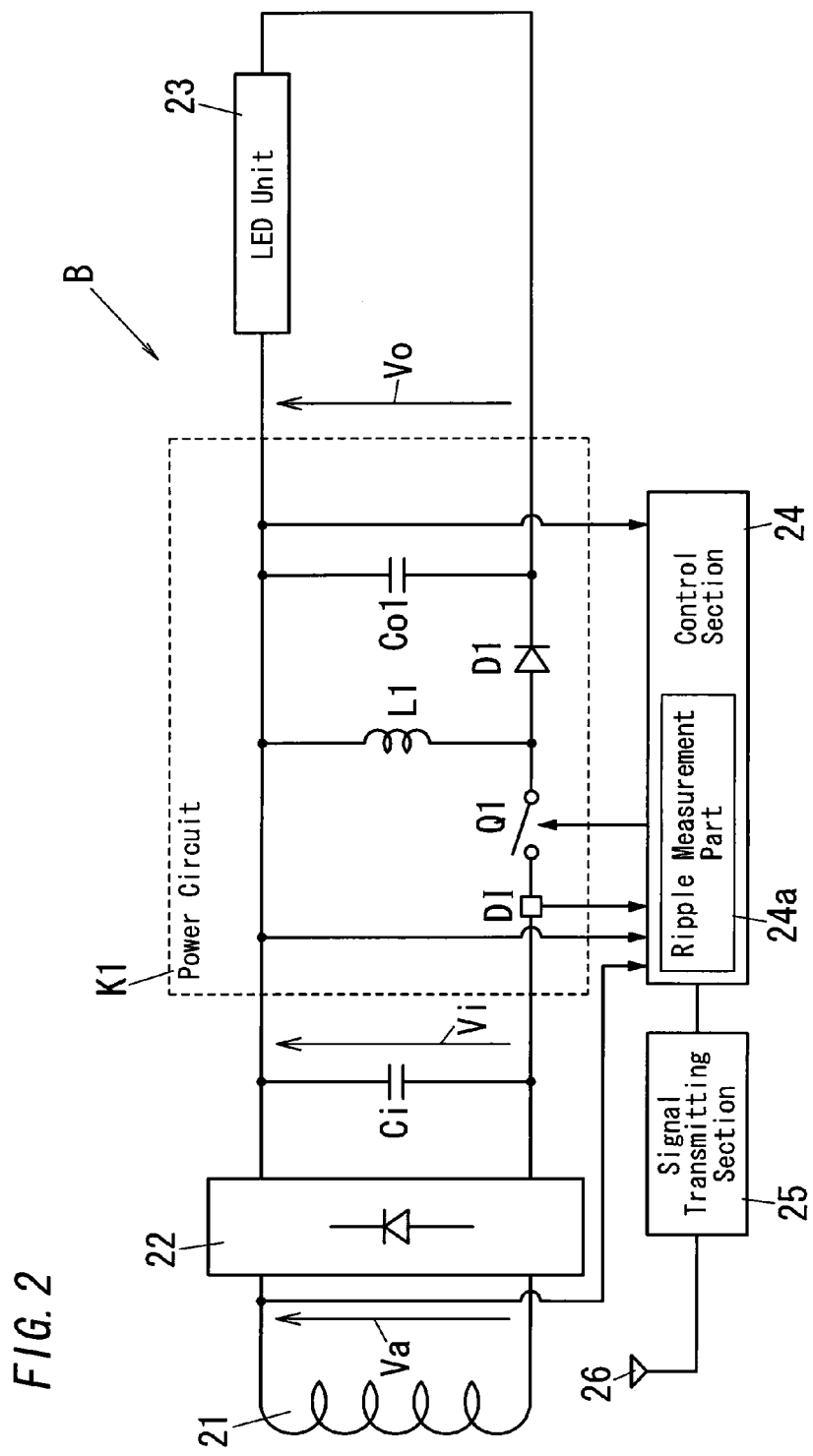
FIG. 2 is a schematic circuit diagram showing a power reception unit according to the first embodiment.

The power circuit K1 of this embodiment is composed of a Buck-Boost converter circuit (a Buck-Boost circuit having one switching device). The circuit configuration of the power circuit K1 is shown in FIG. 2.

In the power circuit K1, a series circuit of an inductor L1 and a switching device Q1 is provided between both ends of the input capacitor Ci, where the inductor L1 is connected to the positive electrode side of the input capacitor Ci and the switching device Q1 is connected to the negative electrode side of the input capacitor Ci. A series circuit of an output capacitor Co1 and a diode D1 is connected between both ends of the inductor L1, where the output capacitor Co1 is connected to the positive electrode side of the input capacitor Ci and the diode D1 is connected to the negative electrode side of the input capacitor Ci. An anode of the diode D1 is connected to the inductor L1, and a cathode of the diode D1 is connected to the output capacitor Co1. A current measurement section D1 (such as a current measurement resistor) is provided between the negative electrode side of the input capacitor Ci and the switching device Q1. The LED unit 23 in which one or more LED devices are connected in series is connected between both ends of the output capacitor Co1.

The control section 24 is configured to measure: the induced voltage Va of the power reception coil 21; an input voltage Vi of the power circuit K1 (voltage across the input capacitor Ci); an output voltage Vo of the power circuit K1 (voltage across the output capacitor Co1); and an electric current flowing through the switching device Q1. The control section 24 includes an induced voltage measurement means (not shown) for measuring the induced voltage Va. The induced voltage measurement means includes such as a series resistors connected between both ends of the power reception coil 21. The control section 24 includes an input voltage measurement means (not shown) for measuring the input voltage Vi. The input voltage measurement means includes such as a series resistors connected between both ends of the input capacitor Ci. The control section 24 includes an output voltage measurement means (not shown) for measuring the output voltage Vo. The output voltage measurement means includes such as a series resistors connected between both ends of the output capacitor Co1. The control section 24 is configured to measure the electric current flowing through the switching device Q1 by the current measurement section D1. The control section 24 controls the switching of the switching device Q1 to turn on and off (chopper control), and controls the signal transmitting section 25, on the basis of the measurement results. The signal transmitting section 25 transmits the wireless signal (such as the radio signal or the infrared signal) to the power transmission unit A through the antenna 26. That is, the power reception unit B and the power transmission unit A communicate wirelessly with each other.

The control section 24 of this embodiment is activated by an electric power supplied from the input capacitor Ci. That is, the control section 24 is activated using an electric power which is supplied from the power transmission unit A to the power reception coil 21. For example, when the voltage Vi across the input capacitor Ci exceeds a predetermined threshold, the control section 24 is activated using an electric power supplied from the input capacitor Ci.

Hereinafter, an operation of the power circuit K1 is described.

When the switching device Q1 is turned on, an electric current flows through a path of the input capacitor Ci, the inductor L1, the switching device Q1 and the input capacitor Ci, thereby a magnetic energy is stored in the inductor L1. And then, when the switching device Q1 is turned off, the magnetic energy in the inductor L1 is discharged through a path of the inductor L1, the diode D1, the output capacitor Co1 and the inductor L1, thereby an electric charge is stored in the output capacitor Co1. As a result, the power circuit K1 generates the output voltage Vo, and an electric current (load current) of constant amount is supplied to the LED unit 23, thereby the LED unit 23 is illuminated. The output voltage Vo is determined by the setting of the operation of the switching device Q1 (such as a duty ratio and switching frequency) and circuit constant (parameter), and also it can be determined whether the output voltage Vo is higher or lower than the input voltage Vi by the setting.

The switching device Q1 can be driven according to a Peak-Current Control method. In this method, the control section 24 turns off the switching device Q1 in response that a peak-value of the electric current (a drain current in case the switching device Q1 is a FET) flowing through the switching device Q1 exceeds a predetermined threshold during an ON-state of the switching device Q1. That is, the control section 24 includes, for example, a reference voltage generation part (such as a 3-terminal regulator or an IC chip having a function of the 3-terminal regulator) for generating a predetermined reference voltage from the input voltage Vi. The control section 24 uses this reference voltage as the abovementioned threshold, and the control section 24 turns off the switching device Q1 when the peak value of the electric current through the switching device Q1 of ON-state exceeds the reference voltage. And then, the control section 24 turns on the switching device Q1 at the time when a predetermined time elapses after turning off the switching device Q1. In summary, the timing of the turn off of the switching device Q1 is determined by a "Peak current" flowing through the switching device Q1, and the timing of the turn on of the switching device Q1 is determined by a "Constant Off Time" (in other words, the control section 24 turns off the switching device Q1 according to "Peak Current Control", and turns on the switching device Q1 according to "Constant Off Time Control"). As a result, the LED unit 23 is supplied with a substantially constant electric current. In this method, the control section 24 keeps the switching device Q1 on until the electric current through the switching device Q1 exceeds the predetermined threshold. Therefore, the switching device Q1 is not turned off before the peak of the electric current flowing through the switching device Q1 reaches the predetermined threshold, even in a valley region (at the bottom) of an undulated input voltage Vi. This configuration enables to realize a stable constant current control.

The switching device Q1 also can be driven according to an Average-Mode Current Control. In this method, average of the electric current flowing through the switching device Q1 is compared with a predetermined threshold, and on and off of the switching device Q1 is controlled according to the compared result. As a result, the LED unit 23 is supplied with a substantially constant electric current. With this configuration, dispersion in the electric current supplied to the LED unit 23 can be reduced. That is, this configuration enables to realize highly precise-constant current control.

The control section 24 may be configured to turn on the switching device Q1 at the timing when an inductor current flowing through the inductor L1 is reduced to a threshold of "0". For example, zero current of the inductor L1 may be detected using a secondary wiring (not shown) of the inductor L1, a drain of the switching device Q1 or the like. Because this method is what is called a "critical mode control", it can achieve the effect of low-noise property, high-efficiency property and the like.

The threshold, which is used for comparing with the inductor current, may be a value Ith of larger value than "0". In this configuration, the switching device Q1 is turned on at the timing when the inductor current flowing through the inductor L1 is reduced to the threshold Ith (larger than "0"). That is, this method is what is called "continuous mode control".

The control section 24 may be configured to turn on the switching device Q1 so as to keep the switching frequency of the switching device Q1 at constant. This configuration enables to make narrower a noise-generating frequency range accompanying with the switching operation.

In this instance, a minimum driving voltage of the power circuit K1 (a voltage at which the control section 24 can be activated) is several Volts. Applying voltage, frequency and the like of the power transmission coil (141~14n), parameters of the input capacitor Ci and the like are adjusted so that the minimum voltage (bottom voltage) of the undulated input voltage Vi is larger than the minimum driving voltage.

The power circuit K1 performs a step-down operation in a range where the input voltage Vi is higher than the output voltage Vo, and performs a boost operation in a range where the input voltage Vi is lower than the output voltage Vo. Thereby, the power circuit K1 can regulate the output voltage Vo at a desired target value even though the input voltage Vi varies in a wide range.

With regard to the power reception unit B, the input voltage Vi varies according to a relative position between the power reception coil 21 and the power transmission coils (141~14n). In such a configuration that a plurality of the power transmission coils (141~14n) is arranged in an array (arrayed-coil configuration), the input voltage Vi may become very small when the power reception coil 21 is placed between the power transmission coils (141~14n). Despite this, because the power reception unit B of this embodiment is provided with the power circuit K1 and the power circuit K1 is composed of the Buck-Boost circuit (which can perform both boost and step-down operations), this embodiment can regulate the output voltage Vo at the target value with respect to a wide range of the input voltage Vi. Therefore, this embodiment enables to stabilize the load current of the LED unit 23, and thereby stabilize the light output.

Therefore, even if the induced voltage Va of the power reception coil 21 varies due to load change (caused by temperature characteristics, time degradation and the like), relative positional misalignment (gap) between the power reception coil 21 and the power transmission coils (141~14n) and the like, the power reception unit B can stabilize the output voltage Vo. In addition, the power reception unit B can output a DC voltage having little ripple component as the output voltage Vo.

The power circuit K1 is composed of the Buck-Boost converter circuit. Therefore, this embodiment can realize a Buck-Boost (boost/step-down) property by using one inductor (inductor L1), and thereby can simplify the configuration.

In this instance, if a buck converter (step-down converter) circuit is used for the power circuit, it cannot boost (step-up) the input voltage Vi in a range where the input voltage Vi is lower than the output voltage Vo due to, for example, the relative position gap between the power reception coil 21 and the power transmission coils (141~14n). If a boost converter circuit is used for the power circuit, it cannot step-down the input voltage Vi in a range where the input voltage Vi is higher than the output voltage Vo. In addition, it the output voltage Vo includes a large ripple component.

Note that, the input voltage Vi is an undulated voltage obtained by performing full-wave rectification and smoothing. For example, the peak value of the input voltage Vi therefore varies between about 10V to 50V, and the minimum voltage (bottom voltage) of the input voltage Vi becomes about 6V, according to the relative position between the power reception coil 21 and the power transmission coils (141~14n). The output voltage Vo is set at a value the average thereof is in a range of 10V to 40V, for example. The output voltage Vo is determined so as not to require a high voltage-resistance to the components of the power circuit K1 and so as not to become inefficient due to a low output voltage Vo.

Typically, the power transmission unit A is configured to supply the power transmission coil 14 with an AC power a frequency thereof is 10 kHz to 1 MHz. The switching frequency of the switching device Q1 in the power circuit K1 of the power reception unit B is typically set to 40 kHz to 10 MHz.

In this embodiment, the control section 24 controls the power circuit K1 so that the switching frequency of the switching device Q1 in the power circuit K1 becomes equal to or larger than the frequency of the AC power supplied to the power transmission coils (141~14n). With this configuration (that is, if the switching frequency of the switching device Q1 is set to be equal to or larger than the frequency of the AC power supplied to the power transmission coil (141~14n)), following advantages can be obtained.

Incidentally, if the input capacitor Ci has a small capacitance, the ripple component of the load current in the LED unit 23 becomes large. In this case, when seeing a screen of such as a video camera under illumination of the LED unit 23, there is a concern of visible flicker caused by the ripple component on the screen. This visible flicker can be reduced by increasing the capacitance of the output capacitor Co1. However, in order to sufficiently reduce the ripple component, it is necessary to increase the capacitance of the output capacitor Co1 in a large amount. In this case, the output capacitor Co1 becomes large in size.

The ripple component also can be reduced by enlarging the capacitance of the input capacitor Ci and ensuring a certain voltage at the bottom of the input voltage Vi. With this configuration, the ripple component can be reduced without using a large sized output capacitor Co1. However, in order to sufficiently reduce the ripple component, it is necessary to increase the capacitance of the input capacitor Ci in a large amount. In this case, the input capacitor Ci becomes large in size.

Herein, the ripple component also can be reduced by setting the switching frequency of the switching device Q1 to be equal to or larger than the frequency of the AC power supplied to the power transmission coil (141~14n)) as in this embodiment. In this embodiment, the switching device Q1 is turned on and off in a time interval shorter than one cycle of the AC power supplied to the power transmission coils (141~14n), thereby the input voltage Vi can be boosted even in a low voltage region of the bottom (valley) region. This configuration enables to reduce the ripple component without causing to enlarge the size of the input capacitor Ci or the output capacitor Co1, and to obtain a stable output. With this configuration, the output voltage Vo can be set to equal to or higher than the bottom voltage of the input voltage Vi.

In general, circuit efficiency is more improved accompanying with the increase of the output voltage Vo when the electric power (load power) supplied to the LED unit 23 is same. Therefore, the circuit efficiency can be improved by using the LED unit 23 which includes a plurality of LED devices connected in series-parallel combination, and by increasing the output voltage Vo.

Further, this embodiment is configured to perform the following operation, if the ripple component of the input voltage Vi is large and the bottom voltage of the input voltage Vi is low or if the ripple component of the output voltage Vo is large.

Note that, the ripple component of the input voltage Vi and/or the output voltage Vo is increased due to the following reasons (1) to (4).

(1) Marked reduction of the induced voltage Va of the power reception coil 21 caused by a large positional misalignment between the power reception coil 21 and the power transmission coils (141~14n).

(2) Variation and/or difference of circuit constant caused by the variability of the circuit components, the temperature characteristics, the degradation characteristics (such as a reduction of capacitance of capacitor due to aging degradation) and the like.

(3) Load change caused by such as temperature characteristics, time degradation and the like.

(4) Difference of configurations between the power reception units B when designing to enable to use plurality kinds of the power reception unit B with respect to one power transmission unit A.

In such cases (if the ripple component is larger than a predetermined threshold), this embodiment increases at least one of the voltage and the frequency of the AC power applied to the power transmission coils (141~14n) of the power transmission unit A. As a result, the bottom voltage of the input voltage Vi can be increased in the power reception unit B (for example, the ripple component can be more easily smoothed through the capacitor when increasing the frequency). In this instance, the efficiency generally decreases if increasing the amplitude or the frequency of the AC voltage applied to the power transmission coils (141~14n). This embodiment therefore takes count of the efficiency and decreases the amplitude and the frequency of the AC voltage applied to the power transmission coils (141~14n) when the ripple component is small. On the other hand, this embodiment takes count of the reduction of the ripple component and increase at least one of the amplitude and the frequency of the AC voltage applied to the power transmission coils (141~14n) when the ripple component is large. This embodiment therefore enables to realize: reduction of the ripple component of the load current of the LED unit 23, and down-sizing of the input capacitor Ci and the output capacitor Co1.

In more detail, the control section 24 in the power reception unit B includes a ripple measurement part 24a. The ripple measurement part 24a measures (detects) the ripple component in the input voltage Vi and/or the output voltage Vo based on the measurement value of the input voltage Vi and/or the output voltage Vo. For example, the ripple measurement part 24a obtains an average value Via of the measurement value of the input voltage Vi, and a difference Vid between the maximum and the minimum of the measurement value of the input voltage Vi. And then, the ripple measurement part 24a determines the ratio of Vid with respect to Via as the ripple component of the input voltage Vi. Also, for example, the ripple measurement part 24a obtains an average value Voa of the measurement value of the output voltage Vo, and a difference Vod between the maximum and the minimum of the measurement value of the output voltage Vo. And then, the ripple measurement part 24a determines the ratio of Vod with respect to Voa as the ripple component of the output voltage Vo. The measurement result of the ripple component measured by the ripple measurement part 24a is transmitted via a wireless signal from the signal transmitting section 25 through the antenna 26.

The signal receiving section 16 in the power transmission unit A receives the wireless signal from the signal transmitting section 25 through the antenna 17, and outputs the signal to the control section 15. The control section 15 controls, based on the received measurement result of the ripple component, the AC source section 13 so as to increase at least one of the amplitude and the frequency of the AC voltage supplied from the AC source section 13 to the power transmission coil 14 when detecting that the ripple component is larger than a predetermined threshold. The control section 15 is preferably configured to control, based on the received measurement result of the ripple component, the AC source section 13 so as to increase at least one of the amplitude and the frequency of the AC voltage applied to the power transmission coil 14 in a stepwise manner for each time the ripple component exceeds one of a plural thresholds.

The power reception unit B and the power transmission unit A communicate with each other using the antennas (17, 26). Note that, the power transmission coil (141~14n) or the power reception coil 21 may also be served as an antenna.

Figure 3:
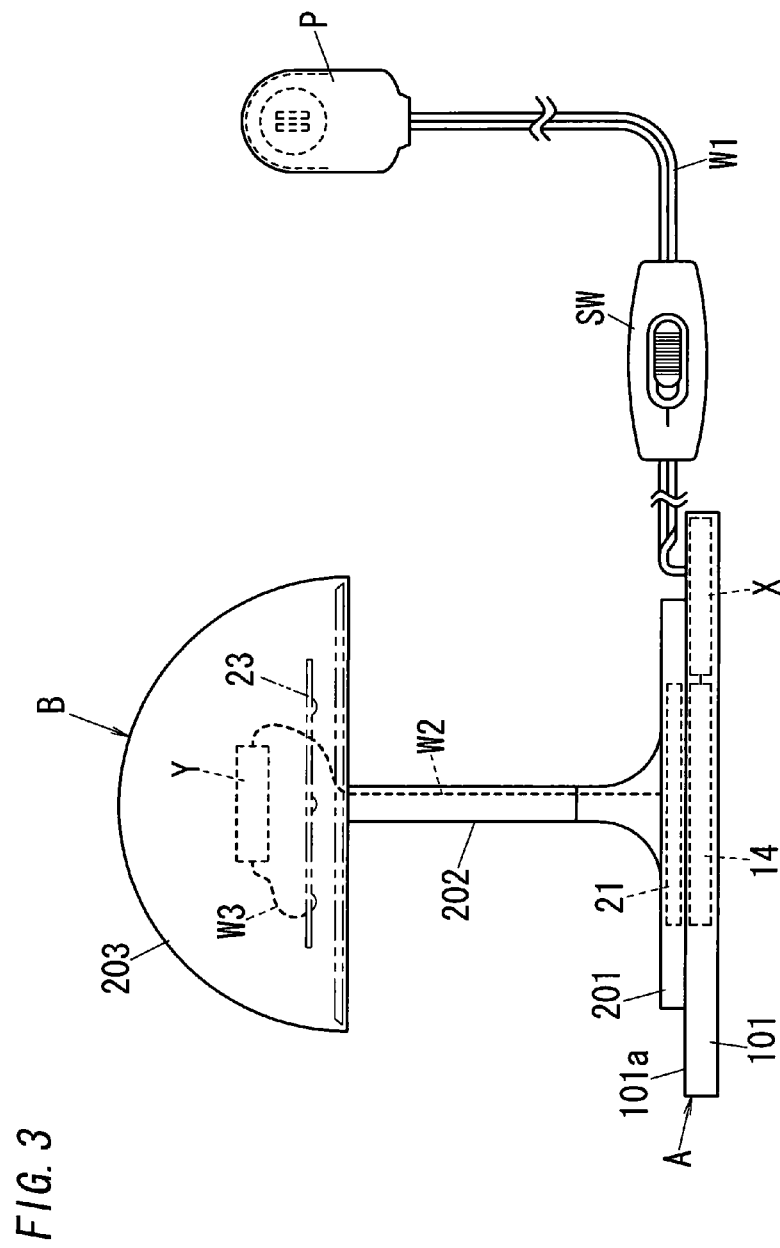
FIG. 3 is an appearance diagram showing a system configuration according to the first embodiment.

Next, an outer appearance of the present system is shown in FIG. 3.

The power transmission unit A has a hollow box-shaped housing 101, and the housing 101 forms the outer shell of the power transmission unit A. The power transmission coils (141~14n) and a power transmission circuit X are housed within the housing 101. One side of the housing 101 is defined as a placement side 101a. The power transmission circuit X includes the rectification section 11, the DC source section 12, the AC source sections (131~13n), the control section 15, the signal receiving section 16 and the antenna 17. The power transmission circuit X is connected to the commercial power source 10 through a wiring W1 and a plug P. A switch SW for switching on/off the power supply to the power transmission unit A is provided at the wiring W1. The power transmission coils (141~14n) are arranged in an array in the housing 101 so as to face a back surface of the placement side 101a. The power transmission unit A adopts the arrayed-coil configuration in which a plurality of the power transmission coils (141~14n) are collocated so as to face the placement side 101a.

The power reception unit B has a base 201, an arm 202 and a lamp fitting 203, and the outer shell of the power reception unit B is formed by them. The power reception unit B forms a lighting apparatus. The base 201 is formed in a hollow box shape. The power reception coil 21 is housed within the base 201. The arm 202 is formed in a hollow cylinder shape. The arm 202 is provided to stand on the top surface of the base 201. The lamp fitting 203 is fixed to the top end of the arm 202. The lamp fitting 203 is formed in a bow shape. The LED unit 23 and a power reception circuit Y are housed within the lamp fitting 203. The LED unit 23 is electrically connected to the power reception circuit Y through a wiring W3. The power reception circuit Y includes the rectification section 22, the input capacitor Ci, the power circuit K1, the control section 24, the signal transmitting section 25 and the antenna 26. The power reception coil 21 in the base 201 is electrically connected to the power reception circuit Y through a wiring W2 provided within the arm 202.

When the base 201 of the power reception unit B is placed on the front surface of the placement side 101a of the power transmission unit A, the power reception coil 21 is faced to at least one of the power transmission coils 14 which are arranged in an array. Thereby, the power reception coil 21 receives an electric power from the power transmission coil (s) 14 in a wireless (contactless) manner.

In this embodiment, there is no need to locate the antenna 17 and the antenna 26 close to each other because the power transmission unit A communicates wirelessly with the power reception unit B. Therefore, it can reduce the length of the wiring, and can expand the possibility of apparatus design. That is, if a communication unit of the power transmission unit A is needed to be located close to a communication unit of the power reception unit B (as in the Document 1 described in BACKGROUND ART), the communication unit of the power reception unit B must be arranged within the base 201. In this case, it is need to provide a new wiring (a wiring connecting between the communication unit and the control section 24) in the inside of the arm 202. In addition, it is need to increase the size of the base 201.

In this embodiment, the power reception circuit Y can be arranged at any position in the lighting apparatus if there is a sufficient space. Arranging position of the power reception circuit Y therefore can be determined considering the design (such as visual effect) of the apparatus. The lighting apparatus of this embodiment has an arrangement space for the power reception circuit Y in the inside of the lamp fitting 203. The power reception circuit Y is provided in the lamp fitting 203. With this configuration, a relatively large power reception circuit Y can be used for the power reception unit B. Therefore, there is no need to sacrifice the design of the apparatus in order to make an arrangement space or no need to downsize the power reception circuit Y by using a compact/thin component for the circuit (which is usually expensive).

Figure 4:
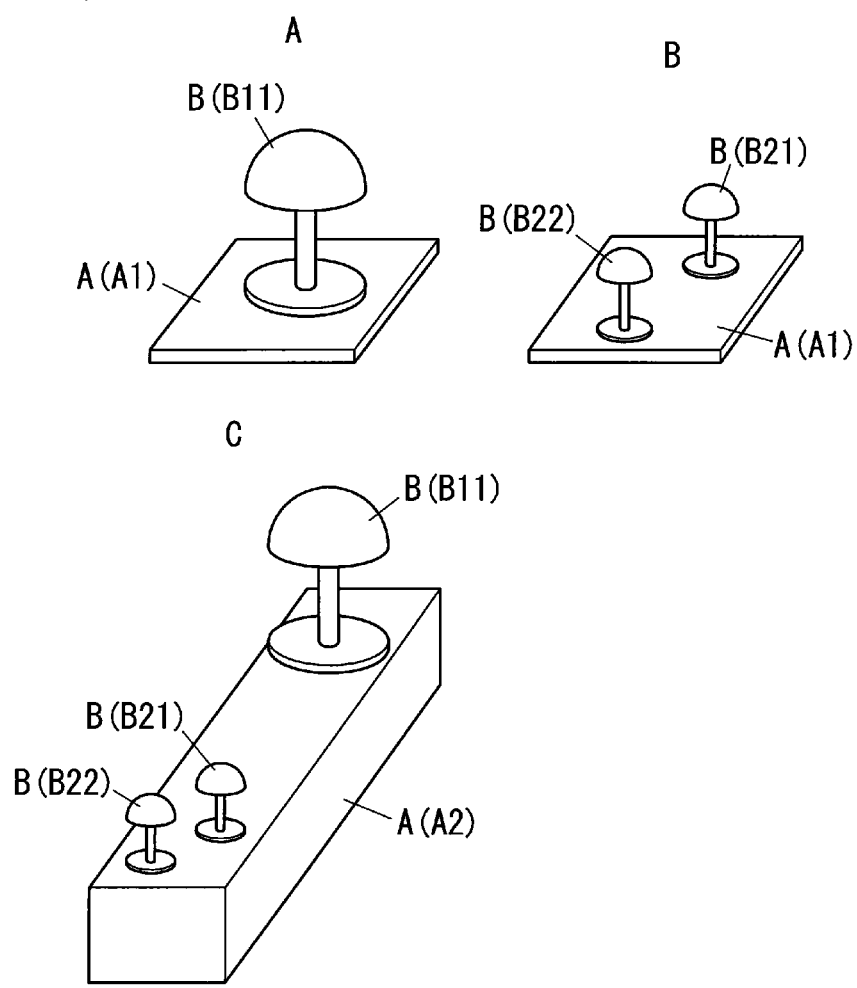
FIGS. 4A to 4C are schematic appearance diagrams for explaining the usage patterns of the first embodiment.

Next, usage patterns of the wireless power supply system for lighting of this embodiment is described with reference to FIG. 4.

As shown in FIG. 4A, a single power reception unit B11 can be used with the power transmission unit A1 when the power reception unit B11 is provided with such a LED unit 23 that includes a high power consumption LED device. Herein, the power reception unit B11 can include a plurality of power reception coils 21. In this case, for example, each of the power transmission coils 14 of the power transmission unit A1 wirelessly supplies electric power to one of the plurality of power reception coils 21 of the power reception unit B11. Or else, the power reception unit B11 can include a single power reception coil 21 having a larger size than the power transmission coil 14. In this case, the plurality of power transmission coils 14 of the power transmission unit A1 wirelessly supplies electric power to the power reception coil 21 of the power reception unit B11.

As shown in FIG. 4B, a plurality of the power reception units (B21, B22) can be used with the power transmission unit A1 when the power reception units (B21, B22) are provided such a LED unit 23 that includes a low power consumption LED device. Herein, each of the power reception units (B21, B22) can include a single power reception coil 21 having a size corresponding to the size of the power transmission coil 14 of the power transmission unit A1. In this case, the power transmission coil 14 of the power transmission unit A1 wirelessly supplies electric power to the power reception coil 21 of the power reception unit (B21, B22). For example, the power transmission coil 141 supplies electric power to the power reception coil 21 of the power reception unit B21, and the power transmission coil 142 supplies electric power to the power reception coil 21 of the power reception unit B22.

Note that, a plurality kinds of power reception units (B21, B22) having different specifications (features; such as the input voltage Vi, the output voltage Vo, the load current or the like) can be used with the power transmission unit A1. That is, the plurality of power reception units B includes a first power reception unit B21 and a second power reception unit B22 configured to have a different rated input power or rated output power from the first receiving unit B21.

As described above, the power transmission unit A1 can be used not only with a plurality of power reception units (B21, B22) having same specification, but also with a plurality of power reception units (B21, B22) having different specifications. Such the effect is obtained by adopting a Buck-Boost circuit as the power circuit K1 of the power reception unit B.

Meanwhile, the power transmission unit A is to have different characteristics according to the specification or size thereof. For example, the power transmission unit A having thin shape, such as the power transmission unit A1 shown in FIG. 4A and FIG. 4B, should be produced using an expensive thin component. For example, a power transmission unit A2 having little limitation in its height as shown in FIG. 4C can be produced using an electric component of inexpensive normal size. Note that, in the power transmission unit A2 having little limitation in the height, the power transmission circuit X can be arranged in any position in the power transmission unit A2. Therefore, the power transmission unit A2 can reduce the length of the wiring, and can expand the possibility of apparatus design. The power transmission unit A2 has a different input/output characteristics from the power transmission unit A1 because of the difference of input power, output power, components used in the unit, circuit constant (caused by variability of component, temperature characteristics, degradation characteristics etc) and the like.

Nevertheless, because the power circuit K1 is composed of a Buck-Boost circuit, the power reception unit B can stabilize the output thereof with respect to a wide range of the input voltage Vi. As a result, as shown in FIG. 4C, the power reception units (B11, B21, B22) can be used not only with the power transmission unit A1, but also with the power transmission unit A2.

That is, the power transmission unit A1 (or A2) can be used with a plurality kinds of power reception units (B11, B21, B22) having different specifications. Also, the power reception unit B can be used not only with the power transmission unit A1 but also with the power transmission unit A2 having different specification with the power transmission unit A1.

The power transmission unit A may be configured to activate only the power transmission coil 14 facing to the power reception unit B, from among the power transmission coils (141~14n). In this configuration, the power transmission unit A is provided with a power reception unit detecting means (not shown) configured to detect a presence of such the power transmission coil 14 to which the power reception unit B (the power reception coil 21 of the power reception unit B) is faced. With this configuration, it enables to realize a system with free layout and high efficiency.

For example, a wireless communication means may be provided to each of the power transmission coil 14 of the power transmission unit A and the power reception unit B, and the power reception unit B may be configured to transmit a presence signal to the power transmission coil 14 facing thereto. With this configuration, the power transmission unit A is enabled to detect the power transmission coil 14 to which the power reception unit B is faced. The wireless communication means may be formed of the signal receiving section 16 and the antenna 17 of the power transmission unit A and the signal transmitting section 25 and the antenna 26 of the power reception unit B (that is, transmitting means of measurement result of the ripple component may also serve as the wireless communication means).

The wireless communication means communicates using a radio signal or an infrared signal. In detail, the wireless communication means can use a low-power radio in 400 MHz band or 900 MHz, Bluetooth, ZigBee, wireless LAN or the like. Especially, because the low-power radio in 400 MHz band or 900 MHz uses a frequency band of low frequency, it has advantages of long communication distance and low power consumption.

The power transmission unit A may be configured to activate all of the power transmission coils (141~14n) simultaneously at a predetermined timing in order to detect a power transmission coil 14 to which the power reception unit B is faced. The power transmission unit A determines the power transmission coil 14 to which the power reception unit B is faced according to whether or not there is a response from the power reception unit B.

For example, the control section 15 detects the power transmission coil 14 to which the power reception unit B is faced using a following steps (A1) to (A5) or (B1) to (B5).

Firstly, the control section 15 has a determination mode and a lighting mode.

In the determination mode, (A1) the control section 15 activates all of the power transmission coils (141~14n) simultaneously at a predetermined timing (for example, at a regular time interval). Note that, if a certain power reception unit B (hereinafter referred to as "Ba") is placed so as to face a certain power transmission coil 14 (hereinafter referred to as "14a"), the power reception coil 21a of the power reception unit Ba is supplied with an electric power from the power transmission coil 14a, and the control section 24a of the power reception unit Ba is activated. When activated, the control section 24a of the power reception unit Ba transmits a response signal to the power transmission unit A through the signal transmitting section 25a.

(A2) If receiving the response signal in a predetermined time, the control section 15 determines that at least one of power reception unit B is placed to face at least one of the power transmission coils (141~14n). If not receiving the response signal in the predetermined time, the control section 15 determines that none of power reception unit B is placed to face the power transmission coils (141~14n).

(A3) When determining that at least one of the power reception unit B is placed, the control section 15 stops supplying electric power to the power transmission coils (141~14n).

(A4) After then, the control section 15 successively activates the power transmission coils (141~14n) in: a predetermined order; a predetermined time; and predetermined time interval. When receiving the electric power from the power transmission coil 14a, the power reception unit Ba transmits the response signal. The control section 15 determines that the power reception unit Ba is placed to face to the power transmission coil 14a which is activated when receiving the response signal. The control section 15 thereby can determine the power transmission coil 14 to which the power reception unit B is faced.

(A5) When completing the step (A4) in respect to all of the power transmission coils (141~14n), the control section 15 finishes the determination mode.

Or else, in the determination mode, (B1) the control section 15 activates all of the power transmission coils (141~14n) simultaneously at a predetermined timing (for example, at a regular time interval). Note that, if a certain power reception unit B (hereinafter referred to as "Ba") is placed so as to face a certain power transmission coil 14 (hereinafter referred to as "14a"), the power reception coil 21a of the power reception unit Ba is supplied with an electric power from the power transmission coil 14a, and the control section 24a of the power reception unit Ba is activated. When activated, the control section 24a of the power reception unit Ba transmits a response signal to the power transmission unit A through the signal transmitting section 25a.

(B2) If receiving the response signal in a predetermined time, the control section 15 determines that at least one of power reception unit B is placed to face at least one of the power transmission coils (141~14n). If not receiving the response signal in the predetermined time, the control section 15 determines that none of power reception unit B is placed to face the power transmission coils (141~14n).

(B3) When determining that at least one of the power reception unit B is placed, the control section 15 keeps supplying electric power to all of the power transmission coils (141~14n).

(B4) After then, the control section 15 successively stops supplying electric power to the power transmission coils (141~14n) in: a predetermined order; a predetermined time; and predetermined time interval. When stops supplying electric power to the power transmission coil 14a, the control section 24a (and the signal transmitting section 25a) of the power reception unit Ba is deactivated. Therefore, the power reception unit Ba stops transmitting the response signal. The control section 15 determines that the power reception unit Ba is placed to face to the power transmission coil 14a which is deactivated when the response signal is not transmitted. (Note that, in a case where a power reception unit Ba is placed to face to a plurality of the power transmission coils 14, and if one of the facing power transmission coil 14 is deactivated, the power reception unit Ba may transmit a second response signal different from the response signal.) The control section 15 thereby can determine the power transmission coil 14 to which the power reception unit B is faced.

(B5) When completing the step (B4) in respect to all of the power transmission coils (141~14n), the control section 15 finishes the determination mode.

The control section 15 shifts into the lighting mode if determining that at least one of the power reception units B is placed on the placement side in the determination mode.

In the lighting mode, the control section 15 supplies an electric power to the power transmission coil 14a which is determined to face the power reception unit Ba. The power reception unit Ba can keep transmitting the response signal during being supplied the electric power from the power transmission coil 14a. The control section 15 can keep activating the power transmission coil 14a during receiving the response signal.

The frequency band of the wireless communication means described above may be set far away from the switching frequency in the power circuit K1, and this configuration enables to suppress the interference therebetween.

This embodiment adopts the arrayed-coil configuration including a plurality of the power transmission coils (141~14n), but is not limited thereto. For example, it may adopt a moving-coil configuration in which the power transmission unit A includes a single power transmission coil 14. In this configuration, the power transmission unit A detects the placed position of the power reception unit B (the power reception coil 21 of the power reception unit B) in the placement side 101a. And then, the power transmission unit A moves the power transmission coil 14 so as to face the detected power reception unit B (so as to face the power reception coil 21 of the detected power reception unit B). In the moving-coil configuration, the power transmission coil 14 corresponds to the power reception coil 21 one-to-one. Therefore, it enables to realize a system with free layout and high efficiency. The power transmission unit A may include a plurality of movable power transmission coils 14. In this configuration, the plurality of power transmission coils 14 are moved so as to face different power reception units B (power reception coils 21), respectively. It is well known to adopt the moving-coil configuration into the wireless power supply system, and is not explained in detail.

In the moving-coil configuration, the power reception coil 21 is possibly misaligned to the power transmission coil 14. In this embodiment however, because the power circuit K1 is composed of a Buck-Boost circuit, even if the induced voltage Va of the power reception coil 21 varies, the power reception unit B can stabilize the output voltage Vo.

Of course, an organic EL device (organic LED device) can be used for the lighting load of the power circuit K1.

The LED device (organic EL device) is lit with high efficiency and low power, and can realize a small voltage/current stress, small noise, small loss, small temperature increase and the like in the wireless power supply system. Therefore, the wireless power supply system can be downsized and simplified in the circuit configuration.

Light output of the LED device (organic EL device) is proportional to the load current flowing through the device. Also, the voltage-current property of LED device (organic EL device) varies significantly in a normal operation range. Therefore, the light output of the LED device (organic EL device) changes drastically even when an applying voltage thereto changes slightly according to variation of circuit constant, control variability or the like. In the worst case, the device may become disrupted due to the variation of the circuit constant etc.

The present system, however, can obtain a stable light output characteristics because the power circuit K1 is composed of a Buck-Boost circuit. The present system is effective especially for such a lighting load (such as an LED device) which requires a high accuracy of the circuit. Because the light output of the LED device (organic EL device) is proportional to the load current flowing through the device, the light output can be stabilized through the constant current control.

Because the light output of the LED device (organic EL device) is proportional to the load current flowing through the device, large ripple component of the load current causes a flicker. Further, the organic EL device has a large capacitance component. Therefore, if the load current has a large ripple component, large amount of current is lost through the charging/discharging in the organic EL device. However, because the power circuit K1 is composed of a Buck-Boost circuit, the present system can supply the load current having small ripple component. Especially, because the switching frequency of the switching device Q1 is set to be equal to or larger than the frequency of the AC power supplied to the power transmission coil 14 in the present system, the ripple component is further reduced. The present system is configured to measure the ripple component by the ripple measurement part 24a, and increase at least one of the amplitude (voltage) and the frequency of the AC voltage supplied to the power transmission coil 14 when the ripple component is larger than a predetermined threshold, therefore the ripple component is further reduced. The present system is more effective for the lighting load of the LED device (organic EL device).

The power reception unit B of this embodiment is formed in a stand-type lighting apparatus as shown in FIG. 3. With this configuration, the power reception unit B enables to provide a lighting apparatus having convenient and safe property which is unique for the wireless power supply system.

Also, an inorganic EL device can be used for the lighting load of the power circuit K1. Furthermore, a planar light source formed of organic EL device, inorganic EL device, or combination of the device and a light guide panel can be used as the lighting load. In this case, the lamp fitting 203 can be formed in a thin shape.

Second Embodiment

Figure 5:
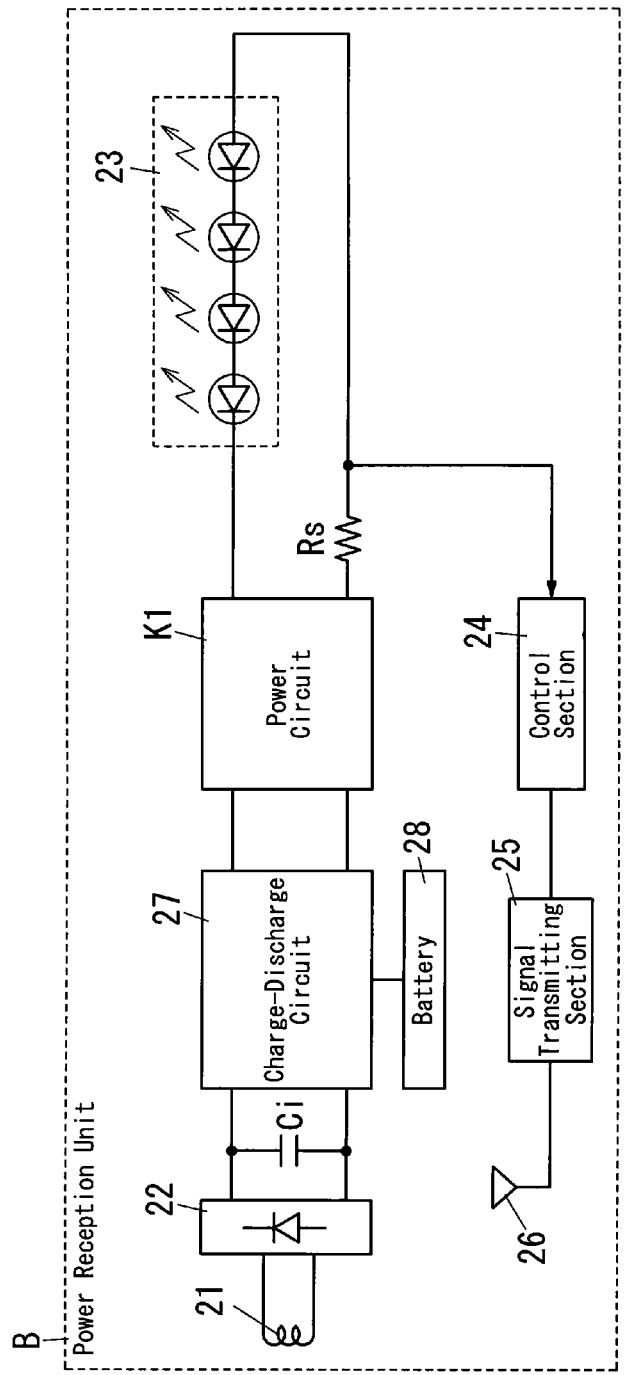
FIG. 5 is a schematic circuit diagram showing a power reception unit according to second embodiment.

The wireless power supply system for lighting of this embodiment includes the same power transmission unit A with that in the first embodiment, and configuration of the power reception unit B is different. A circuit configuration of the power reception unit B of this embodiment is shown in FIG. 5. Note that, like kind elements are assigned the same reference signs as depicted in the first embodiment, and are not explained in detail.

The power reception unit B is provided with a charge-discharge circuit 27 between the input capacitor Ci and the power circuit K1. A battery 28 is connected to the charge-discharge circuit 27.

The charge-discharge circuit 27 has: a charging function of charging the battery 28 using the electric power of the power reception coil 21; and a discharging function of discharging the stored power in the battery 28 to the power circuit K1. As a result, the charge-discharge circuit 27 can supply an electric power from the battery 28 to the power circuit K1 even when an electric power is not supplied from the power reception coil 21 due to such as an electric outage, breakdown or the like. Therefore, this embodiment can illuminate the LED unit 23 even when the electric power is not supplied from the power reception coil 21.

Because the power circuit K1 is composed of the Buck-Boost converter circuit (as shown in FIG. 2), this embodiment can stabilize the output thereof with respect to a wide range of the input voltage Vi. This embodiment therefore can stabilize the load current supplied to the LED unit 23 in either case where a voltage of the battery 28 is higher than the output voltage Vo and a case where a voltage of the battery 28 is lower than the output voltage Vo. The power circuit K1 may be configured to output a smaller amount of electric current so as to reduce the electric consumption in the LED unit 23 when the power circuit K1 is driven through the electric power from the battery 28 (i.e. when the electric power is not supplied from the power reception coil 21). That is, the control section 24 may be configured to measure the induced voltage Va of the power reception coil 21, and determine that an electric power is not supplied from the power reception coil 21 if the measured induced voltage Va is lower than a predetermined threshold. This configuration enables to suppress the discharge amount of the battery 28, thereby the stored energy in the battery 28 can be used effectively.

In this embodiment, the control section 24 measures the output current (load current) of the power circuit K1, compares the measured value of the output current with a predetermined threshold, and controls on and off of the switching device Q1 according to the compared result. Thereby, this embodiment supplies the LED unit 23 with a constant current. The output current of the power circuit K1 is measured through a voltage generated across a resistor Rs connected in series with the LED unit 23. With this configuration, dispersion of the load current supplied to the LED unit 23 can be reduced. That is, this configuration enables to realize a highly-precise-constant current control. Note that, this configuration (a configuration in which measuring the output current of the power circuit K1 through the resistor Rs) can be applied to the abovedescribed first embodiment or third to seventh embodiments explained below.

Third Embodiment

The wireless power supply system for lighting of this embodiment includes the same power transmission unit A with that in the first embodiment, and configuration of power circuit of the power reception unit B is different. Circuit configurations of the power circuits (K2~K5) of the power reception unit B of this embodiment are shown in FIGS. 6 to 9. Note that, like kind elements are assigned the same reference signs as depicted in the first embodiment, and are not explained in detail.

Figure 6:
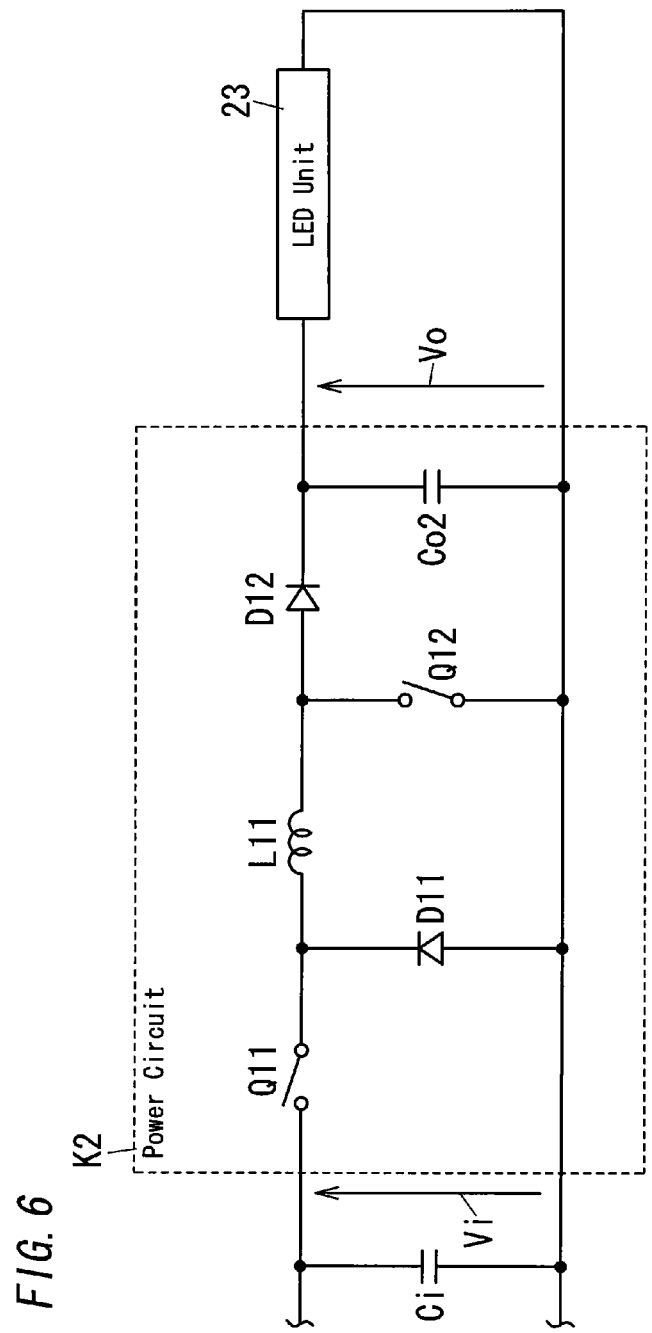
FIG. 6 is a schematic circuit diagram showing a power circuit using a Buck-Boost chopper circuit having two switching devices, according to third embodiment.

The power circuit K2 shown in FIG. 6 is composed of a Buck-Boost chopper circuit having two switching devices.

In the power circuit K2, a series circuit of a switching device Q11 and a diode D11 is provided between both ends of the input capacitor Ci, where the switching device Q11 is connected to the positive electrode side of the input capacitor Ci and an anode of the diode D11 is connected to the negative electrode side of the input capacitor Ci. A series circuit of an inductor L11 and a switching device Q12 is connected between both ends of the diode D11, where the inductor L11 is connected to the positive electrode side of the input capacitor Ci and the switching device Q12 is connected to the negative electrode side of the input capacitor Ci. A series circuit of a diode D12 and an output capacitor Co2 is connected between both ends of the switching device Q12, where an anode of the diode D12 is connected to the positive electrode side of the input capacitor Ci and the output capacitor Co2 is connected to the negative electrode side of the input capacitor Ci. The LED unit 23 in which one or more LED devices are connected in series is connected between both ends of the output capacitor Co2. The control section 24 controls the switching of the switching devices (Q11, Q12) to turn on and off (chopper control) to perform a boost/step-down operation, and output a constant current to the LED unit 23.

Figure 7:
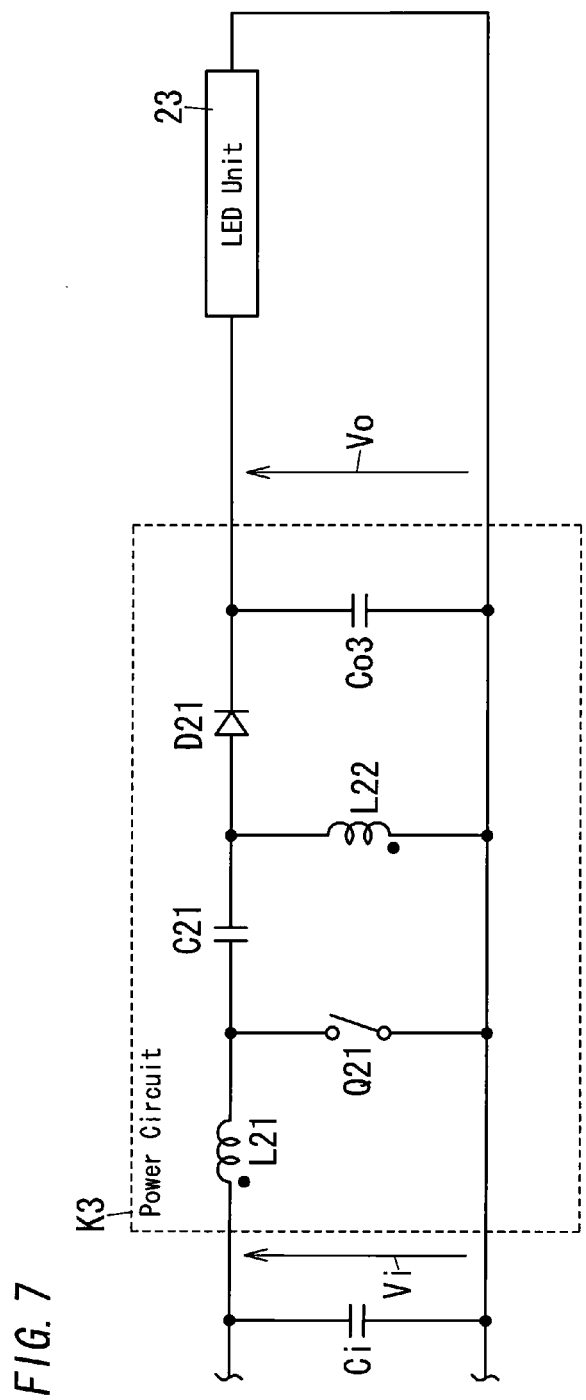
FIG. 7 is a schematic circuit diagram showing a power circuit using a SEPIC circuit according to third embodiment.

The power circuit K3 shown in FIG. 7 is composed of a SEPIC circuit which performs a boost/step-down operation.

In the power circuit K3, a series circuit, in which an inductor L21, a capacitor C21, a diode D21 and the LED unit 23 are connected in this order, is inserted in a path from the positive electrode to the negative electrode of the input capacitor Ci. A switching device Q21 is connected between: a junction of the inductor L21 and the capacitor C21; and the negative electrode of the input capacitor Ci. An inductor L22 is connected between: a junction of the capacitor C21 and the diode D21; and the negative electrode of the input capacitor Ci. An output capacitor Co3 is connected in parallel with the inductor L22 through the diode D21. An anode of the diode D21 is connected to the capacitor C21, and a cathode of the diode D21 is connected to the LED unit 23. The control section 24 controls the switching of the switching device Q21 to turn on and off (chopper control) to perform a boost/step-down operation, and output a constant current to the LED unit 23.

Figure 8:
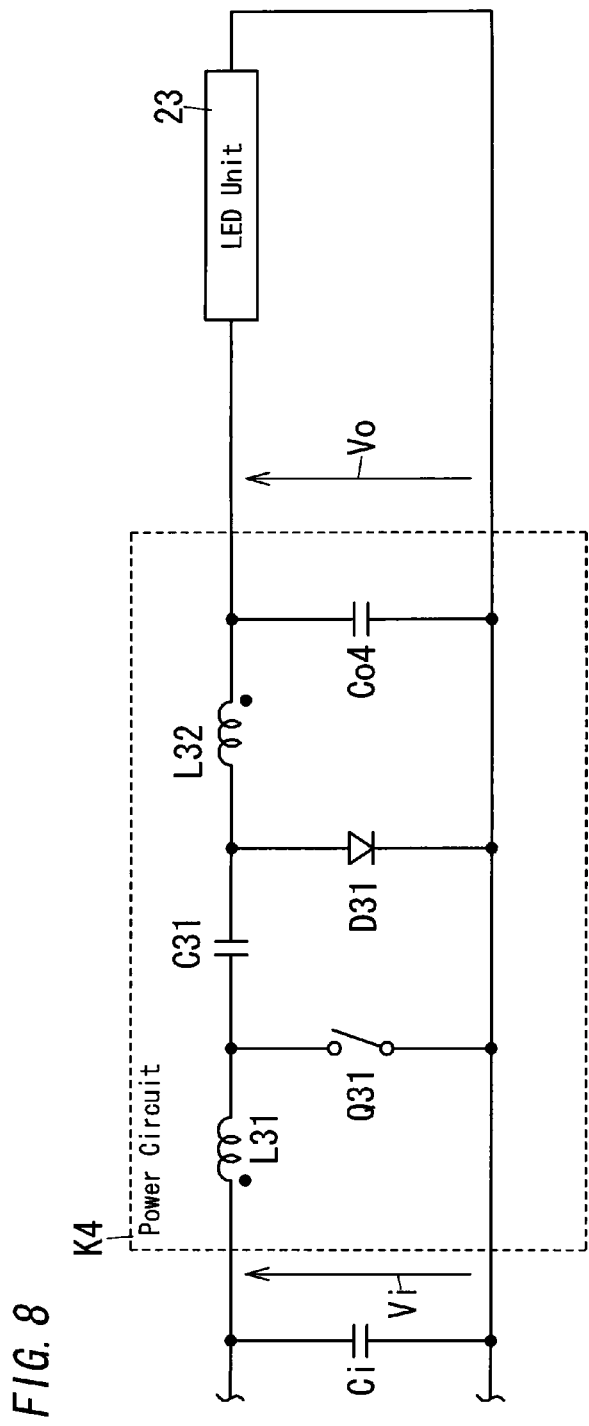
FIG. 8 is a schematic circuit diagram showing a power circuit using a CUK circuit according to third embodiment.

The power circuit K4 shown in FIG. 8 is composed of a CUK circuit which performs a boost/step-down operation.

In the power circuit K4, a series circuit, in which a inductor L31, a capacitor C31, an inductor L32 and the LED unit 23 are connected in this order, is inserted in a path from the positive electrode to the negative electrode of the input capacitor Ci. A switching device Q31 is connected between: a junction of the inductor L31 and the capacitor C31; and the negative electrode of the input capacitor Ci. A diode D31 is connected between: a junction of the capacitor C31 and the inductor L32; and the input capacitor Ci, where an anode of the diode D31 is connected to the junction of the capacitor C31 and the inductor L32, and a cathode of the diode D31 is connected to the negative electrode of the input capacitor Ci. An output capacitor Co4 is connected in parallel with the diode D31 through the inductor L32. The control section 24 controls the switching of the switching device Q31 to turn on and off (chopper control) to perform a boost/step-down operation, and output a constant current to the LED unit 23.

Figure 9:
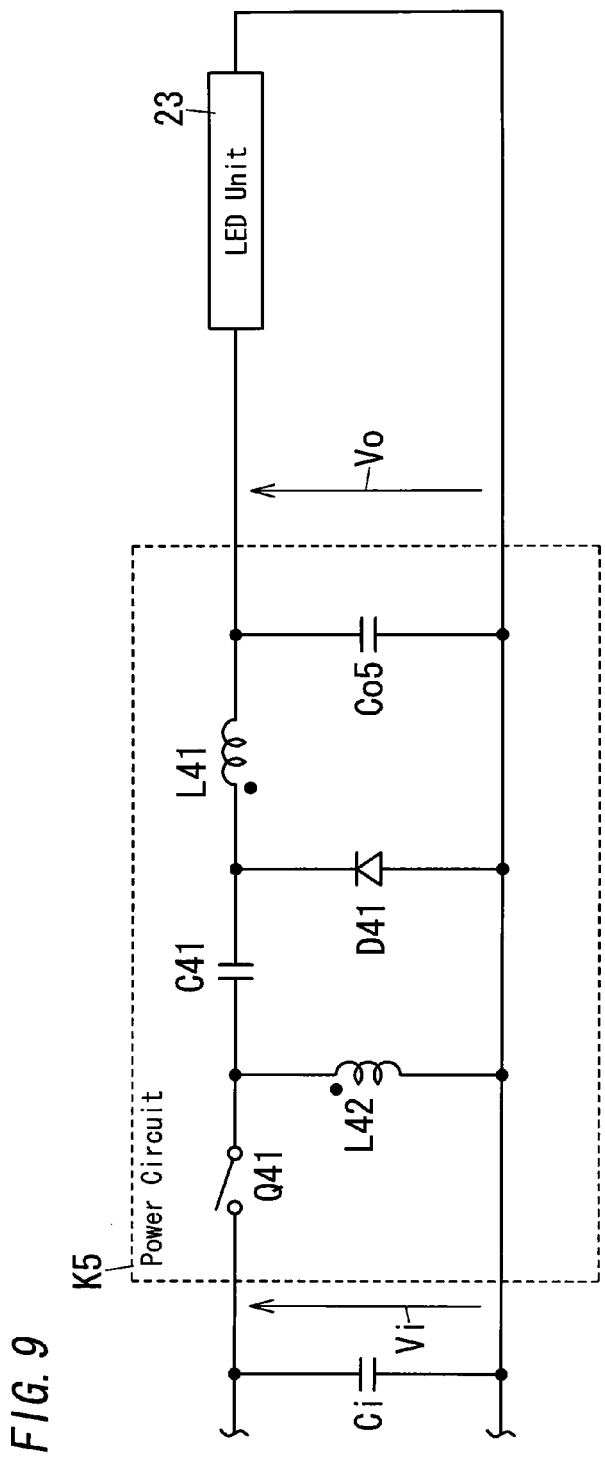
FIG. 9 is a schematic circuit diagram showing a power circuit using a ZETA circuit according to third embodiment.

The power circuit K5 shown in FIG. 9 is composed of a ZETA circuit which performs a boost/step-down operation.

In the power circuit K5, a series circuit, in which a switching device Q41, a capacitor C41, an inductor L41 and the LED unit 23 are connected in this order, is inserted in a path from the positive electrode to the negative electrode of the input capacitor Ci. An inductor L42 is connected between: a junction of the switching device Q41 and the capacitor C41; and the negative electrode of the input capacitor Ci. A diode D41 is connected between: a junction of the capacitor C41 and the inductor L41; and the negative electrode of the input capacitor Ci, where an anode of the diode D41 is connected to the negative electrode of the input capacitor Ci, and a cathode of the diode D41 is connected to the junction of the capacitor C41 and the inductor L41. An output capacitor Co5 is connected in parallel with the diode D41 through the inductor L41. The control section 24 controls the switching of the switching device Q41 to turn on and off (chopper control) to perform a boost/step-down operation, and output a constant current to the LED unit 23.

Behaviors of the Buck-Boost chopper circuit having two switching devices, the SEPIC circuit, the CUK circuit and the ZETA circuit are know, and are not explained in detail.

Even if there is a fluctuation in the output of the power reception coil 21 due to load change or relative position gap between the power reception coil 21 and the power transmission coils (141~14n), the power reception unit B can stabilize the output power to the lighting load as similar with the first embodiment by adopting the power circuit (K2 K5) shown in FIGS. 6 to 9.

The power circuit K2 composed of the Buck-Boost chopper circuit having two switching devices can realize the buck-boost operation by a single inductor (inductor L11), and it can simplify the configuration of the power circuit.

The power circuit K3 composed of the SEPIC circuit can reduce the ripple component of the input voltage. The power circuit K4 composed of the CUK circuit can reduce the ripple component of the input voltage and the output voltage. The power circuit K5 composed of the ZETA circuit can reduce the ripple component of the output voltage. As a result, the power circuit (K3~K5) enables to downsize the input capacitor Ci and the output capacitor (Co3~Co5).

Fourth Embodiment

Figure 10:
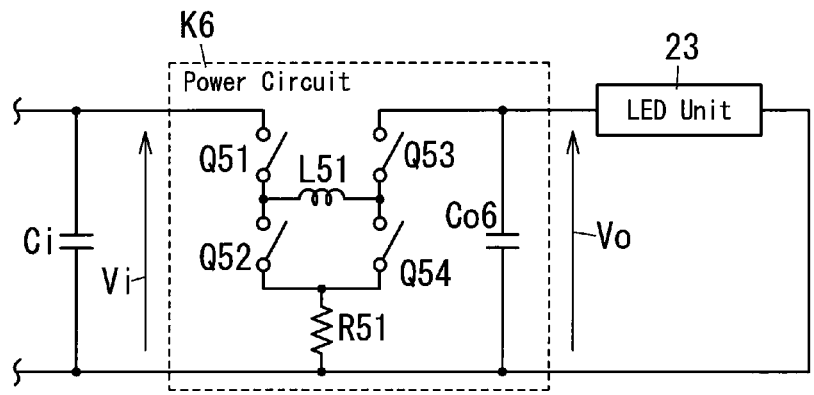
FIG. 10 is a schematic circuit diagram showing a power circuit using a 4-switch synchronous Buck-boost circuit according to fourth embodiment.

The wireless power supply system for lighting of this embodiment includes the same power transmission unit A with that in the first embodiment, and configuration of power circuit of the power reception unit B is different. A circuit configuration of the power circuit K6 of the power reception unit B of this embodiment is shown in FIG. 10. Note that, like kind elements are assigned the same reference signs as depicted in the first embodiment, and are not explained in detail.

The power circuit K6 shown in FIG. 10 is composed of a 4-switch synchronous Buck-Boost circuit.

In the power circuit K6, a series circuit of a switching device Q51, an inductor L51 and a switching device Q53 is provided at the high-voltage side line (positive electrode side) of the input capacitor Ci. A series circuit of switching devices (Q52, Q54) is connected between both ends of the inductor L51. A resistor R51 is connected between: a junction of the switching devices (Q52, Q54); and the low-voltage side line (negative electrode side) of the input capacitor Ci. An output capacitor Co6 is connected between both ends of a series circuit of the switching devices (Q53, Q54) and the resistor R51. The LED unit 23 is connected between both ends of the output capacitor Co6.

The control section 24 controls the switching of the switching devices (Q51 Q54) to turn on and off (chopper control) to perform a boost/step-down operation, and output a constant current to the LED unit 23 based on the current value measured by the resistor R51.

The power circuit K6 is controlled to perform the PWM switching operation of the switching devices (Q51~Q54) in a book-boost region (a region in which a target value of the output voltage Vo is roughly the same with the input voltage Vi). In detail, the power circuit K6 repeats the operations of: (I) turning on only the switching devices (Q51, Q54); (II) turning on only the switching devices (Q51, Q53); (III) turning on only the switching devices (Q52, Q53); and (IV) turning on only the switching devices (Q51, Q53). The power circuit K6 can select a boost operation and a step-down operation by adjusting the time lengths of each steps (I)~(IV). In a boost region, the power circuit K6 is controlled to: keep turning on the switching device Q51; keep turning off the switching device Q52; and perform the PWM switching operation (switching on and off) of the switching devices (Q53, Q54). In a step-down region, the power circuit K6 is controlled to: keep turning on the switching device Q53; keep turning off the switching device Q54; and perform the PWM switching operation (switching on and off) of the switching devices (Q51, Q52).

The power circuit K6 composed of the 4-switch synchronous Buck-Boost circuit can suppress a peak-to-peak value of the inductor current flowing through the inductor L51, and thus can reduce the ripple component of the load current in the LED unit 23. Because the power circuit K6 adopts the synchronous rectification method, it is enabled to achieve high circuit efficiency over a wide range of the input voltage Vi.

Fifth Embodiment

A soft-start function of the power circuit (K1~K6) of the first to fourth embodiment is explained in this embodiment. That is, the wireless power supply system for lighting of this embodiment includes any one type of the power transmission unit A and the power reception unit B described in the first to fourth embodiments, and the control section 24 has the soft-start function. Hereinafter, when not particularly specified, the power circuit is denoted by a sign "K".

At the start-up of the power reception unit B, the control section 24 of this embodiment performs a soft-start operation to control the power circuit K when the input voltage Vi reaches a predetermined value (a voltage value at which the power circuit K is started). In the soft-start operation, the output voltage Vo is gradually increased. That is, the control section 24 controls, at the start of lighting, the power circuit K (switching device(s) of the power circuit K) so that the output voltage Vo increases gradually.

Examples of the waveform of the output voltage Vo according to the soft-start operation are shown in FIGS. 11A~11E.

Figure 11:
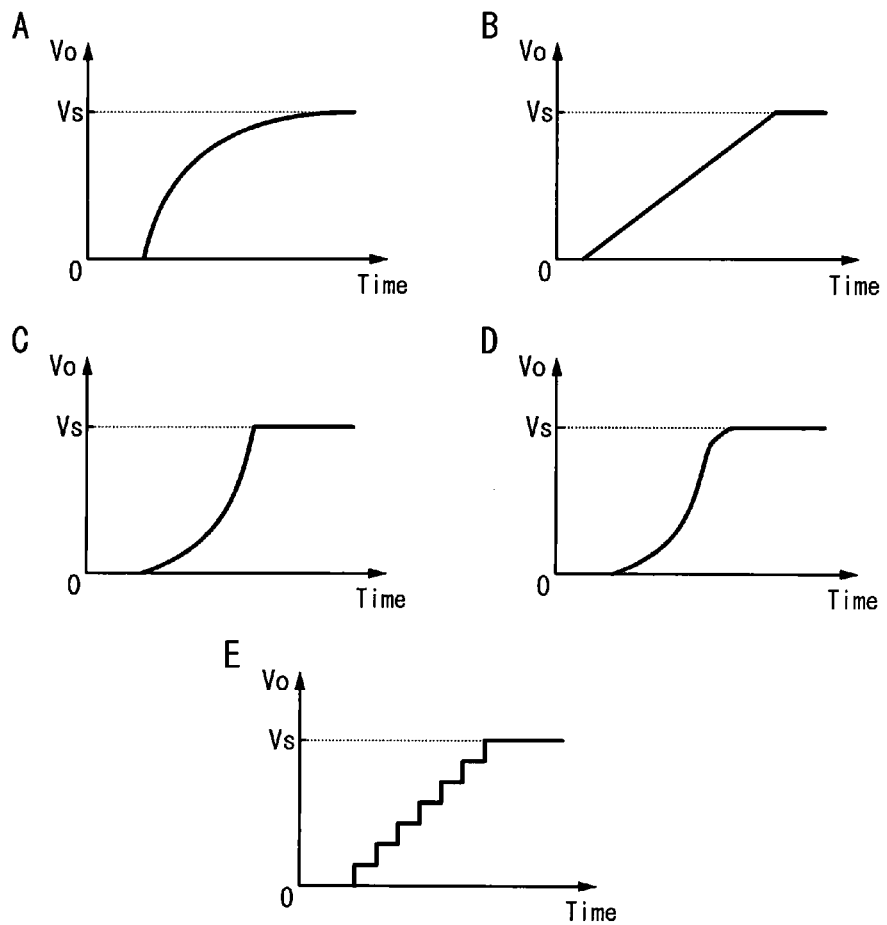
FIGS. 11A to 11E are wave diagrams of output voltage for explaining soft-start operation according to fifth embodiment.

In the example shown in FIG. 11A, the output voltage Vo increases along with a curve shown in the figure where the gradient of the curve gradually decreases (the gradient of the curve is maximum at the time of start-up), and approaches a steady voltage Vs gently.

In the example shown in FIG. 11B, the output voltage Vo increases in direct proportion to time until reaching a steady voltage Vs.

In the example shown in FIG. 11C, the output voltage Vo increases along with a curve shown in the figure where the gradient of the curve gradually increases (the gradient of the curve is minimum at the time of start-up) until the output voltage Vo reaches to a steady voltage Vs.

In the example shown in FIG. 11D, the output voltage Vo increases along with a curve shown in the figure where the gradient of the curve gradually increases until a predetermined voltage level, and after then the output voltage Vo gently approaches a steady voltage Vs.

In the example shown in FIG. 11E, the output voltage Vo increases in stepwise fashion until reaching a steady voltage Vs.

If supplying the LED unit 23 with a load current/load voltage of a steady state at the start-up of the power circuit K, the component of the power circuit K may be stressed caused by an overshoot of the load current or load voltage. It may cause to decrease the life or disrupt the component of the power circuit K. Especially in the wireless power supply system for lighting, the power transmission coil 14 and the power reception coil 21 is likely to generate a positional misalignment therebetween, and therefore the component is possibly subjected the stress depending on the operation point of the power circuit K.

If there is a dispersion/variation of the lighting load, a dispersion/variation of the input voltage, a dispersion/variation (time degradation, temperature characteristics etc.) of the circuit component or the like, the operation point of the power circuit K may be caused to deviate when rising the load current or load voltage of the LED unit 23 in short time at the start-up. In this case, an excess current or excess voltage is suddenly applied to the component of the power circuit K. Because there may generate a deviation (misalignment) between the power reception coil 21 and the power transmission coil 14, the operation point is possibly deviate widely. In this case, the component is subject to be stressed largely, and therefore it is required to suppress the excess current or excess voltage.

In this embodiment, as described above, the control section 24 controls the power circuit K to perform a soft-start operation, in which the output voltage Vo is gradually increased, at the start-up of the power reception unit B. Therefore, it is enabled to reduce the stress on the component of the power circuit K caused by the overshoot, the excess current or excess voltage. Especially, it is effective to the wireless power supply system for lighting which is likely to generate a position deviation between the power transmission coil 14 and the power reception coil 21

With the example shown in FIG. 11A, because there is no inflection point, it is enabled to effectively suppress the overshoot, the excess current and the excess voltage.

With the example shown in FIG. 11B, because the voltage increases at a constant rate and the stress change rate becomes substantially constant, it is enabled to prevent a charge current through a capacitance component of the circuit from locally increasing.

With the example shown in FIG. 11C, it is enabled to reduce power consumption during the start-up operation compared with the examples shown in FIGS. 11A, 11B.

With the example shown in FIG. 11D, it is enabled to reduce power consumption during the start-up operation compared with the examples shown in FIGS. 11A, 11B. Further, it is enabled reduce the stress on the component compared with the example of the FIG. 11C because the change rate of the voltage thereof does not change significantly when reaching a steady voltage Vs.

With the example shown in FIG. 11E, because it does not need a high accuracy, it is enabled to be realized by using inexpensive component.

In this embodiment, because the power circuit K is composed of the Buck-Boost circuit, it is enabled to perform the soft-start operation finely even in a low output voltage Vo region without depending on the output condition of the power reception coil 21 or the target value of the output voltage Vo.

In summary, in this embodiment, the control section 24 includes the input voltage measurement means (not shown) for measuring the input voltage Vi supplied from the power reception coil 21 to the power circuit K. The control section 24 is configured to start to activate the power circuit K upon the measured result (measured voltage) of the input voltage measurement means reaches a predetermined value. The control section 24 is configured, at the start-up of the operation of the power circuit K, to control the power circuit K (switching device(s) of the power circuit K) so that the output voltage Vo of the power circuit K increases gradually.

With this configuration, it is enabled to reduce the stress on the component of the power circuit K as well as reduce the stress on the lighting load.

Sixth Embodiment

Figure 12:
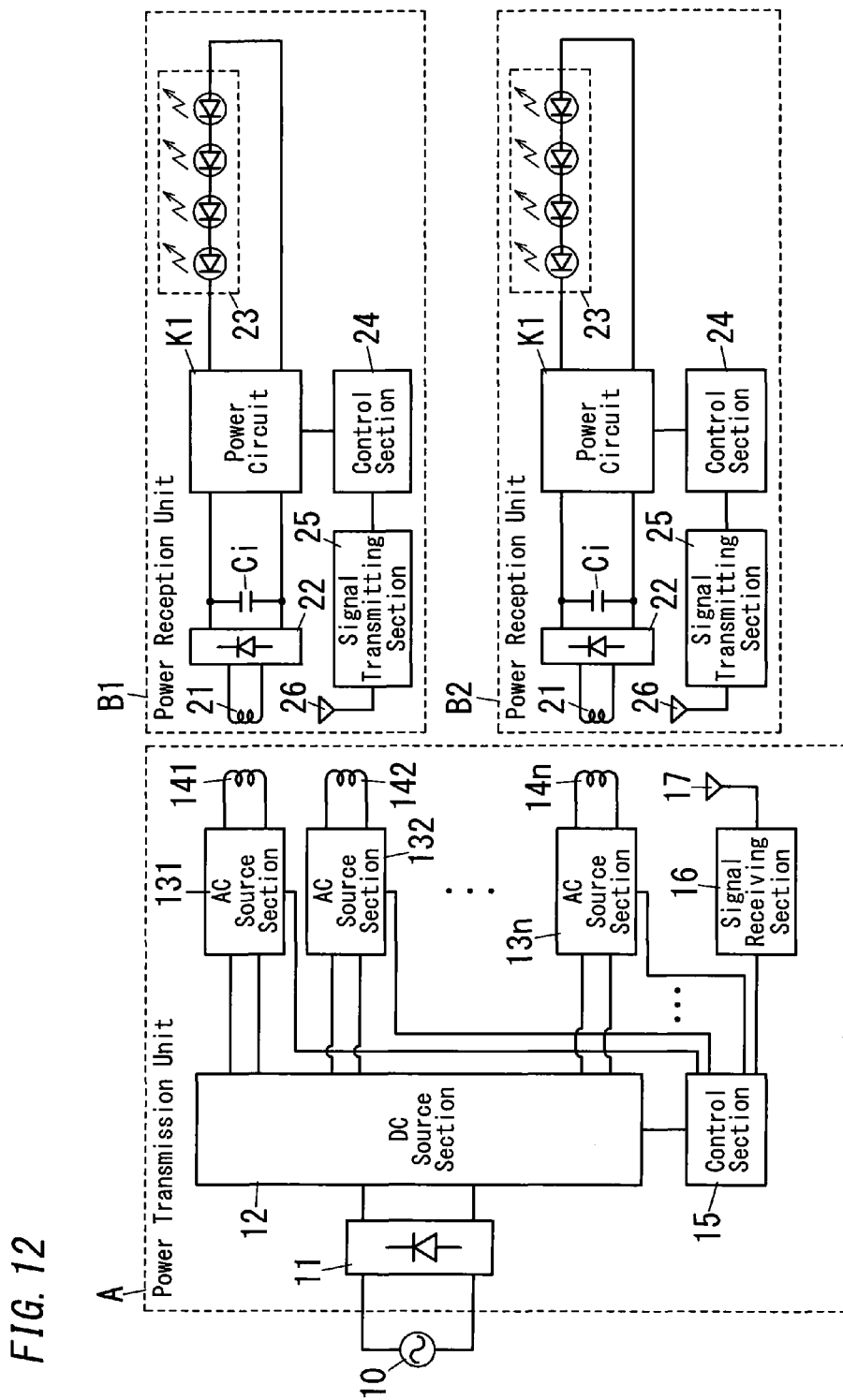
FIG. 12 is a schematic circuit diagram showing a system configuration according to sixth embodiment.

A circuit configuration of the wireless power supply system for lighting of this embodiment is shown in FIG. 12. In the wireless power supply system for lighting of this embodiment, configuration of power transmission unit A is different from that in the first embodiment. The control section 24 of the power reception unit B of this embodiment has the soft-start function (refer to fifth embodiment). Note that, like kind elements are assigned the same reference signs as depicted in the first embodiment, and are not explained in detail.

The control section 15 of the power transmission unit A is configured to synchronization control the operations of the AC source sections ($13_1 \sim 13n$). In detail, the control section 15 is configured to control the switching operations of the AC source sections ($13_1 \sim 13n$) so that the phases of AC voltage applied to the power transmission coils ($14_1 \sim 14n$) are synchronized with one another.

Therefore, even when a power reception unit B is placed on a position between a plurality of the power transmission coils 14 and receives electric power from a plurality of the power transmission coil 14, the system can stabilize the supply power. It is desirable to suppress the phase difference in the AC voltages of the power transmission coils ($14_1 \sim 14n$) within 30 degree.

The control section 15 of the power transmission unit A is configured to activate only the AC source section 13 which is connected to the power transmission coil 14 to which the power reception unit B is faced, from among the plurality of power transmission coils ($14_1 \sim 14n$). In this configuration, the power transmission unit A is provided with a power reception unit detecting means (not shown) configured to detect a power transmission coil 14 to which the power reception unit B (the power reception coil 21 of the power reception unit B) is faced. Further, the control section 24 of the power reception unit B has a function of the soft-start operation of the power circuit K1 (refer to fifth embodiment).

At the time of the start-up, the control section 15 of the power transmission unit A activates only the AC source section 13 which is connected to the power transmission coil 14 to which the power reception unit B is faced, and the control section 24 of the power reception unit B performs the soft-start operation. When the power reception unit B is removed, the control section 15 deactivates the AC source 13 which is connected to the power transmission coil 14 to which the removed power reception unit B has been faced.

The abovementioned soft-start operation and the phase synchronization operation of AC voltage are independent of each other, and therefore desired controlling value (control condition) can be adapted with respect to each operations. As a result, this embodiment is enabled to simultaneously achieve a stabilization of power supply and a reduction of stress at the start-up.

Even when a plurality of the power reception unit B having different specifications are placed on a single power transmission unit A, each the power reception unit B has the soft-start characteristics according to its specification. Each of the power reception unit B can reduce the stress on the component of the power circuit K. In such a power reception unit B which is likely to cause the overshoot (such as having high load power or load voltage), the soft-start time (a time period by which the output voltage Vo reaches a steady voltage) operated by the control section 24 can be made longer. Or else, the size of the power reception coil 21 may be changed (adjusted) so as to change the amount of receiving electric power according to the specification of the power reception unit B. For example, the power reception unit B requiring a large load power may include a power reception coil 21 with a larger size so that a plurality numbers of power transmission coils 14 can be faced to the power reception coil 21.

The control section 24 of the power reception unit B has a function of adjusting the soft-start time, thereby it can gradually increase the light output so that a user can visually recognize the time variance of the light output of the LED unit 23 (for example, the control section 24 sets the soft-start time for 5 seconds and gradually increase the light output so that the user can visually recognize the time variance of the light output). That is, the "soft-start" function also can serve as a "fade-in" function. Therefore, the system can start to light the LED unit 23 softly and gently at the start-up of the power reception unit B.

In the soft-start operation, the control section 24 of the power reception unit B is configured to increase the load current or load voltage of the LED unit 23 based on a predetermined target value. Therefore, this embodiment can stabilize the increasing rate of the light output regardless of a positional relation of coils, a dispersion/variation of the lighting load, a dispersion/variation of the input voltage, a dispersion/variation (time degradation, temperature characteristics etc.) of the circuit component or the like. That is, this embodiment is enabled to increase the light output of the LED unit 23 every time at a desired rate, which is unique effect to lighting.

Of course, any one of the power circuits (K2~K6) described in the third, fourth embodiments can be applied to the power reception unit B of this embodiment. Either case of adopting the power circuit (K2~K6) can obtain the same effects described in this embodiment.

Seventh Embodiment

Figure 13:
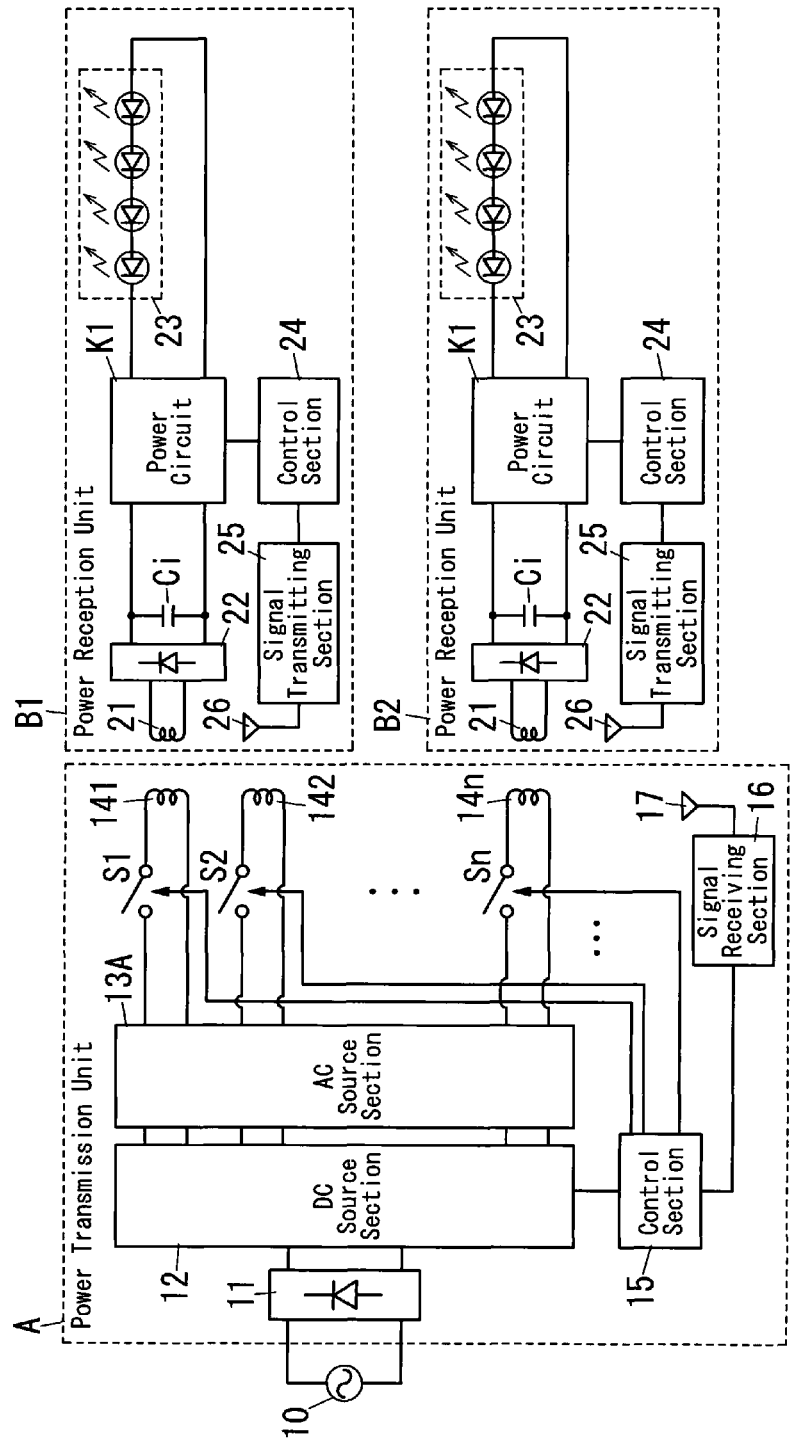
FIG. 13 is a schematic circuit diagram showing a system configuration according to seventh embodiment.

A circuit configuration of the wireless power supply system for lighting of this embodiment is shown in FIG. 13. In the wireless power supply system for lighting of this embodiment, configuration of power transmission unit A is different from that in the first embodiment. The control section 24 of power reception unit B of this embodiment has the soft-start function (refer to fifth embodiment). Note that, like kind elements are assigned the same reference signs as depicted in the first embodiment, and are not explained in detail.

The power transmission unit A of this embodiment includes a single AC source section 13A configured to activate all the power transmission coils (141~14n). A plurality of switches (S1~Sn) are installed in electric paths between the AC source section 13A and the power transmission coils (141~14n), respectively. Hereinafter, when not particularly specified, the switch is denoted by a sign "S". When the switch (S1~Sn) is turned on, AC electric power is supplied from the AC source section 13A to a corresponding power transmission coil (141~14n). When the switch (S1~Sn) is turned off, electric power is not supplied from the AC source section 13A to the corresponding power transmission coil (141~14n).

In this embodiment, because the power transmission coils (141~14n) are supplied electric power from a single AC source section 13A, the phases of AC voltage applied to the power transmission coils (141~14n) are synchronized with one another. Therefore, even when a power reception unit B is placed on a position between a plurality of the power transmission coils 14 and receives electric power from the plurality of power transmission coils 14, the system can stabilize the supply power.

Further, the power transmission unit A is provided with a power reception unit detecting means (not shown) configured to detect a power transmission coil 14 to which the power reception unit B (the power reception coil 21 of the power reception unit B) is faced. The control section 15 of the power transmission unit A turns on only the switch S which is connected to the power transmission coil 14 to which the power reception unit B is faced, from among the plurality of power transmission coils (141~14n). The control section 24 of the power reception unit B has a function of the soft-start operation of the power circuit K1 (refer to fifth embodiment).

At the time of the start-up, the control section 15 of the power transmission unit A turns on only the switch S which is connected to the power transmission coil 14 to which the power reception unit B is faced, and the control section 24 of the power reception unit B performs the soft-start operation. When the power reception unit B is removed, the control section 15 turns off the switch S which is connected to the power transmission coil 14 to which the removed power reception unit B has been faced.

The abovementioned soft-start operation and the phase synchronization operation of AC voltage are independent of each other, and therefore desired controlling value (control condition) can be adapted with respect to each operations. As a result, this embodiment is enabled to simultaneously achieve a stabilization of power supply and a reduction of stress at the start-up.

Of course, any one of the power circuits (K2~K6) described in the third, fourth embodiments can be applied to the power reception unit B of this embodiment. Either case of adopting the power circuit (K2~K6) can obtain the same effects described in this embodiment. Other configuration or effect of this embodiment is similar with the sixth embodiment, and is not explained in detail.

The control section 15 in the first to seventh embodiment can be composed of a microcomputer.

The invention claimed is:

1. A wireless power supply system for lighting comprising:
a power transmission unit comprising a power transmission coil, said power transmission coil being configured to generate an AC magnetic field in response to a supplied AC power; and
a power reception unit comprising a power reception coil, said power reception coil being configured to receive an electric power from said power transmission unit through an electromagnetic induction due to the AC magnetic field generated by said power transmission coil,
wherein said power reception unit comprises a power circuit and a receive-side control section, said power circuit being configured to receive an output power from said power reception coil and to perform Buck-Boost operation so as to output a predetermined electric power to a lighting load, said receive-side control section being configured to control the Buck-Boost operation of said power circuit, wherein said power circuit is configured to be capable of boosting and stepping-down of the output power from said power reception coil, wherein said power reception unit further comprises: a rectification section configured to rectify an output voltage of said power reception coil and to output a rectified voltage to said power circuit; a ripple measurement section configured to measure a ripple component in an input or output of said power circuit; and a signal transmitting section configured to transmit the measurement result of the ripple component to said power transmission unit, wherein said power transmission unit further comprises: a signal receiving section configured to receive the measurement result transmitted from said signal sending section; and an AC source section configured to supply the AC voltage to said power transmission coil, and wherein said power transmission unit is configured, when said ripple component is larger than a predetermined threshold, to increase at least one of an amplitude and a frequency of the AC voltage which is supplied to said power transmission coil from said AC source section.

2. The wireless power supply system for lighting as set forth in claim 1, wherein said receive-side control section is configured to measure an output current from said power circuit, and to control said power circuit so as to supply said lighting load with a constant current based on the measured output current value.

3. The wireless power supply system for lighting as set forth in claim 1,
    wherein said power circuit comprises a switching device being capable of turning on and off by a chopper control, and
    wherein said receive-side control section is configured to measure a peak value of an electric current flowing through said switching device, and to control said power circuit so as to supply said lighting load with a constant current based on the measured peak value.

4. The wireless power supply system for lighting as set forth in claim 1,
    wherein said power circuit comprises a switching device being capable of turning on and off by a chopper control, and
    wherein said receive-side control section is configured to measure an average value of an electric current flowing through said switching device, and to control said power circuit so as to supply said lighting load with a constant current based on the measured average value.

5. The wireless power supply system for lighting as set forth in claim 1,
    wherein said power reception unit comprises a rectification section configured to rectify an output voltage of said power reception coil and to output a rectified voltage to said power circuit,
    wherein said power circuit comprises a switching device being capable of turning on and off by a chopper control, and
    wherein said receive-side control section is configured to control said power circuit so that switching frequency of said switching device is equal to or more than a frequency of the AC power supplied to said power transmission coil.

6. The wireless power supply system for lighting as set forth in claim 1,
    wherein said wireless power supply system is adapted so that one of said power transmission unit supplies a plurality of said power reception units with electric power, and
    wherein said plurality of said power reception units include a first power reception unit and a second power reception unit, said second power reception unit being configured to have a different input power or output power in specification from said first receiving unit.

7. The wireless power supply system for lighting as set forth in claim 1, wherein said lighting load includes an LED device or an organic EL device.

8. A wireless power supply system for lighting comprising:
    a power transmission unit comprising a power transmission coil, said power transmission coil being configured to generate an AC magnetic field in response to a supplied AC power; and
    a power reception unit comprising a power reception coil, said power reception coil being configured to receive an electric power from said power transmission unit through an electromagnetic induction due to the AC magnetic field generated by said power transmission coil,
    wherein said power reception unit comprises a power circuit and a receive-side control section, said power circuit being configured to receive an output power from said power reception coil and to perform Buck-Boost operation so as to output a predetermined electric power to a lighting load, said receive-side control section being configured to control the Buck-Boost operation of said power circuit,
    wherein said power circuit is configured to be capable of boosting and stepping-down of the output power from said power reception coil,
    wherein said power transmission unit further comprises a hollow housing, one side of said housing being defined as a placement side, a plurality of said power transmission coils being arranged so as to face a back surface of said placement side, and
    wherein said power reception unit is placed on a front surface of said placement side.

9. The wireless power supply system for lighting as set forth in claim 8, wherein said receive-side control section is configured to measure an output current from said power circuit, and to control said power circuit so as to supply said lighting load with a constant current based on the measured output current value.

10. The wireless power supply system for lighting as set forth in claim 8,
    wherein said power circuit comprises a switching device being capable of turning on and off by a chopper control, and
    wherein said receive-side control section is configured to measure a peak value of an electric current flowing through said switching device, and to control said power circuit so as to supply said lighting load with a constant current based on the measured peak value.

11. The wireless power supply system for lighting as set forth in claim 8,
    wherein said power circuit comprises a switching device being capable of turning on and off by a chopper control, and
    wherein said receive-side control section is configured to measure an average value of an electric current flowing through said switching device, and to control said power circuit so as to supply said lighting load with a constant current based on the measured average value.

12. The wireless power supply system for lighting as set forth in claim 8,
wherein said power reception unit comprises a rectification section configured to rectify an output voltage of said power reception coil and to output a rectified voltage to said power circuit,
wherein said power circuit comprises a switching device being capable of turning on and off by a chopper control, and
wherein said receive-side control section is configured to control said power circuit so that switching frequency of said switching device is equal to or more than a frequency of the AC power supplied to said power transmission coil.

13. The wireless power supply system for lighting as set forth in claim 8,
wherein said wireless power supply system is adapted so that one of said power transmission unit supplies a plurality of said power reception units with electric power, and
wherein said plurality of said power reception units include a first power reception unit and a second power reception unit, said second power reception unit being configured to have a different input power or output power in specification from said first receiving unit.

14. The wireless power supply system for lighting as set forth in claim 8, wherein said lighting load includes an LED device or an organic EL device.

15. A wireless power supply system for lighting comprising:
a power transmission unit comprising a power transmission coil, said power transmission coil being configured to generate an AC magnetic field in response to a supplied AC power; and
a power reception unit comprising a power reception coil, said power reception coil being configured to receive an electric power from said power transmission unit through an electromagnetic induction due to the AC magnetic field generated by said power transmission coil,
wherein said power reception unit comprises a power circuit and a receive-side control section, said power circuit being configured to receive an output power from said power reception coil and to perform Buck-Boost operation so as to output a predetermined electric power to a lighting load, said receive-side control section being configured to control the Buck-Boost operation of said power circuit,
wherein said power circuit is configured to be capable of boosting and stepping-down of the output power from said power reception coil,
wherein said power transmission unit further comprises a hollow housing, one side of said housing being defined as a placement side,
wherein said power transmission unit is provided with one or more of said power transmission coils so as to face a back surface of said placement side, said power transmission coils being configured to be movable, and
wherein said power transmission unit is configured to move said power transmission coils so as to face said power reception unit when said power reception unit is placed on a front surface of said placement side.

16. The wireless power supply system for lighting as set forth in claim 15, wherein said receive-side control section is configured to measure an output current from said power circuit, and to control said power circuit so as to supply said lighting load with a constant current based on the measured output current value.

17. The wireless power supply system for lighting as set forth in claim 15,
wherein said power circuit comprises a switching device being capable of turning on and off by a chopper control, and
wherein said receive-side control section is configured to measure a peak value of an electric current flowing through said switching device, and to control said power circuit so as to supply said lighting load with a constant current based on the measured peak value.

18. The wireless power supply system for lighting as set forth in claim 15,
wherein said power circuit comprises a switching device being capable of turning on and off by a chopper control, and
wherein said receive-side control section is configured to measure an average value of an electric current flowing through said switching device, and to control said power circuit so as to supply said lighting load with a constant current based on the measured average value.

19. The wireless power supply system for lighting as set forth in claim 15,
wherein said power reception unit comprises a rectification section configured to rectify an output voltage of said power reception coil and to output a rectified voltage to said power circuit,
wherein said power circuit comprises a switching device being capable of turning on and off by a chopper control, and
wherein said receive-side control section is configured to control said power circuit so that switching frequency of said switching device is equal to or more than a frequency of the AC power supplied to said power transmission coil.

20. The wireless power supply system for lighting as set forth in claim 15,
wherein said wireless power supply system is adapted so that one of said power transmission unit supplies a plurality of said power reception units with electric power, and
wherein said plurality of said power reception units include a first power reception unit and a second power reception unit, said second power reception unit being configured to have a different input power or output power in specification from said first receiving unit.

21. The wireless power supply system for lighting as set forth in claim 15, wherein said lighting load includes an LED device or an organic EL device.

* * * * *